United States Patent
Li

(10) Patent No.: US 11,726,699 B2
(45) Date of Patent: Aug. 15, 2023

(54) METHOD AND SYSTEM FOR FACILITATING MULTI-STREAM SEQUENTIAL READ PERFORMANCE IMPROVEMENT WITH REDUCED READ AMPLIFICATION

(71) Applicant: Alibaba Singapore Holding Private Limited, Singapore (SG)

(72) Inventor: Shu Li, Bothell, WA (US)

(73) Assignee: ALIBABA SINGAPORE HOLDING PRIVATE LIMITED, Singapore (SG)

( * ) Notice: Subject to any disclaimer, the term of this patent is extended or adjusted under 35 U.S.C. 154(b) by 72 days.

(21) Appl. No.: 17/217,778

(22) Filed: Mar. 30, 2021

(65) Prior Publication Data
US 2022/0317917 A1  Oct. 6, 2022

(51) Int. Cl.
G06F 3/00 (2006.01)
G06F 3/06 (2006.01)
G06F 12/0862 (2016.01)

(52) U.S. Cl.
CPC .......... *G06F 3/0655* (2013.01); *G06F 3/0604* (2013.01); *G06F 3/0679* (2013.01); *G06F 12/0862* (2013.01); *G06F 2212/6026* (2013.01)

(58) Field of Classification Search
CPC ..... G06F 2212/6026; G06F 2212/6024; G06F 8/4442; G06F 9/3802; G06F 9/383; G06F 12/0862
See application file for complete search history.

(56) References Cited

U.S. PATENT DOCUMENTS 3,893,071 A  7/1975 Bossen
4,562,494 A  12/1985 Bond
(Continued)

FOREIGN PATENT DOCUMENTS

JP  2003022209  1/2003
JP  2011175422  9/2011
(Continued)

OTHER PUBLICATIONS https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

(Continued)

*Primary Examiner* — Reginald G Bragdon
*Assistant Examiner* — Michael L Westbrook
(74) *Attorney, Agent, or Firm* — Shun Yao; Yao Legal Services, Inc.

(57) ABSTRACT

One embodiment provides a system which facilitates data management. The system receives, by a storage device via read requests from multiple streams, a first plurality of logical block addresses (LBAs) and corresponding stream identifiers. The system assigns a respective LBA to a first queue of a plurality of queues based on the stream identifier corresponding to the LBA. Responsive to determining that a second plurality of LBAs in the first queue are of a sequentially similar pattern: the system retrieves, from a non-volatile memory of the storage device, data associated with the second plurality of LBAs; and the system stores the retrieved data and the second plurality of LBAs in a volatile memory of the storage device while bypassing data-processing operations.

20 Claims, 10 Drawing Sheets

(56) References Cited

U.S. PATENT DOCUMENTS

| | | |
|---|---|---|
| 4,718,067 A | 1/1988 | Peters |
| 4,775,932 A | 10/1988 | Oxley |
| 4,858,040 A | 8/1989 | Hazebrouck |
| 5,394,382 A | 2/1995 | Hu |
| 5,602,693 A | 2/1997 | Brunnett |
| 5,715,471 A | 2/1998 | Otsuka |
| 5,732,093 A | 3/1998 | Huang |
| 5,802,551 A | 9/1998 | Komatsu |
| 5,930,167 A | 7/1999 | Lee |
| 6,098,185 A | 8/2000 | Wilson |
| 6,148,377 A | 11/2000 | Carter |
| 6,226,650 B1 | 5/2001 | Mahajan et al. |
| 6,243,795 B1 | 6/2001 | Yang |
| 6,457,104 B1 | 9/2002 | Tremaine |
| 6,658,478 B1 | 12/2003 | Singhal |
| 6,795,894 B1 | 9/2004 | Neufeld |
| 7,351,072 B2 | 4/2008 | Muff |
| 7,565,454 B2 | 7/2009 | Zuberi |
| 7,599,139 B1 | 10/2009 | Bombet |
| 7,953,899 B1 | 5/2011 | Hooper |
| 7,958,433 B1 | 6/2011 | Yoon |
| 8,024,719 B2 | 9/2011 | Gorton, Jr. |
| 8,085,569 B2 | 12/2011 | Kim |
| 8,144,512 B2 | 3/2012 | Huang |
| 8,166,233 B2 | 4/2012 | Schibilla |
| 8,260,924 B2 | 9/2012 | Koretz |
| 8,281,061 B2 | 10/2012 | Radke |
| 8,452,819 B1 | 5/2013 | Sorenson, III |
| 8,516,284 B2 | 8/2013 | Chan |
| 8,527,544 B1 | 9/2013 | Colgrove |
| 8,751,763 B1 | 6/2014 | Ramarao |
| 8,819,367 B1 | 8/2014 | Fallone |
| 8,825,937 B2 | 9/2014 | Atkisson |
| 8,832,688 B2 | 9/2014 | Tang |
| 8,868,825 B1 | 10/2014 | Hayes |
| 8,904,061 B1 | 12/2014 | O'Brien, III |
| 8,949,208 B1 | 2/2015 | Xu |
| 9,015,561 B1 | 4/2015 | Hu |
| 9,031,296 B2 | 5/2015 | Kaempfer |
| 9,043,545 B2 | 5/2015 | Kimmel |
| 9,088,300 B1 | 7/2015 | Chen |
| 9,092,223 B1 | 7/2015 | Pani |
| 9,129,628 B1 | 9/2015 | Fallone |
| 9,141,176 B1 | 9/2015 | Chen |
| 9,208,817 B1 | 12/2015 | Li |
| 9,213,627 B2 | 12/2015 | Van Acht |
| 9,213,632 B1 | 12/2015 | Song |
| 9,251,058 B2 | 2/2016 | Nellans |
| 9,258,014 B2 | 2/2016 | Anderson |
| 9,280,472 B1 | 3/2016 | Dang |
| 9,280,487 B2 | 3/2016 | Candelaria |
| 9,311,939 B1 | 4/2016 | Malina |
| 9,336,340 B1 | 5/2016 | Dong |
| 9,436,595 B1 | 9/2016 | Benitez |
| 9,495,263 B2 | 11/2016 | Pang |
| 9,529,601 B1 | 12/2016 | Dharmadhikari |
| 9,529,670 B2 | 12/2016 | O'Connor |
| 9,569,454 B2 | 2/2017 | Ebsen |
| 9,575,982 B1 | 2/2017 | Sankara Subramanian |
| 9,588,698 B1 | 3/2017 | Karamcheti |
| 9,588,977 B1 | 3/2017 | Wang |
| 9,607,631 B2 | 3/2017 | Rausch |
| 9,671,971 B2 | 6/2017 | Trika |
| 9,722,632 B2 | 8/2017 | Anderson |
| 9,747,202 B1 | 8/2017 | Shaharabany |
| 9,830,084 B2 | 11/2017 | Thakkar |
| 9,836,232 B1 | 12/2017 | Vasquez |
| 9,852,076 B1 | 12/2017 | Garg |
| 9,875,053 B2 | 1/2018 | Frid |
| 9,910,705 B1 | 3/2018 | Mak |
| 9,912,530 B2 | 3/2018 | Singatwaria |
| 9,923,562 B1 | 3/2018 | Vinson |
| 9,933,973 B2 | 4/2018 | Luby |
| 9,946,596 B2 | 4/2018 | Hashimoto |
| 10,013,169 B2 | 7/2018 | Fisher |
| 10,199,066 B1 | 2/2019 | Feldman |
| 10,229,735 B1 | 3/2019 | Natarajan |
| 10,235,198 B2 | 3/2019 | Qiu |
| 10,268,390 B2 | 4/2019 | Warfield |
| 10,318,467 B2 | 6/2019 | Barzik |
| 10,361,722 B2 | 7/2019 | Lee |
| 10,417,086 B2 | 9/2019 | Lin |
| 10,437,670 B1 | 10/2019 | Koltsidas |
| 10,459,663 B2 | 10/2019 | Agombar |
| 10,459,794 B2 | 10/2019 | Baek |
| 10,466,907 B2 | 11/2019 | Gole |
| 10,484,019 B2 | 11/2019 | Weinberg |
| 10,530,391 B2 | 1/2020 | Galbraith |
| 10,635,529 B2 | 4/2020 | Bolkhovitin |
| 10,642,522 B2 | 5/2020 | Li |
| 10,649,657 B2 | 5/2020 | Zaidman |
| 10,649,969 B2 | 5/2020 | De |
| 10,678,432 B1 | 6/2020 | Dreier |
| 10,756,816 B1 | 8/2020 | Dreier |
| 10,831,734 B2 | 11/2020 | Li |
| 10,928,847 B2 | 2/2021 | Suresh |
| 10,990,526 B1 | 4/2021 | Lam |
| 11,016,932 B2 | 5/2021 | Qiu |
| 11,023,150 B2 | 6/2021 | Pletka |
| 11,068,165 B2 | 7/2021 | Sharon |
| 11,068,409 B2 | 7/2021 | Li |
| 11,126,561 B2 | 9/2021 | Li |
| 11,138,124 B2 | 10/2021 | Tomic |
| 11,243,694 B2 | 2/2022 | Liang |
| 11,360,863 B2 | 6/2022 | Varadan |
| 2001/0003205 A1 | 6/2001 | Gilbert |
| 2001/0032324 A1 | 10/2001 | Slaughter |
| 2001/0046295 A1 | 11/2001 | Sako |
| 2002/0010783 A1 | 1/2002 | Primak |
| 2002/0039260 A1 | 4/2002 | Kilmer |
| 2002/0073358 A1 | 6/2002 | Atkinson |
| 2002/0095403 A1 | 7/2002 | Chandrasekaran |
| 2002/0112085 A1 | 8/2002 | Berg |
| 2002/0161890 A1 | 10/2002 | Chen |
| 2003/0074319 A1 | 4/2003 | Jaquette |
| 2003/0145274 A1 | 7/2003 | Hwang |
| 2003/0163594 A1 | 8/2003 | Aasheim |
| 2003/0163633 A1 | 8/2003 | Aasheim |
| 2003/0217080 A1 | 11/2003 | White |
| 2004/0010545 A1 | 1/2004 | Pandya |
| 2004/0066741 A1 | 4/2004 | Dinker |
| 2004/0103238 A1 | 5/2004 | Avraham |
| 2004/0143718 A1 | 7/2004 | Chen |
| 2004/0255171 A1 | 12/2004 | Zimmer |
| 2004/0267752 A1 | 12/2004 | Wong |
| 2004/0268278 A1 | 12/2004 | Hoberman |
| 2005/0038954 A1 | 2/2005 | Saliba |
| 2005/0097126 A1 | 5/2005 | Cabrera |
| 2005/0138325 A1 | 6/2005 | Hofstee |
| 2005/0144358 A1 | 6/2005 | Conley |
| 2005/0149827 A1 | 7/2005 | Lambert |
| 2005/0174670 A1 | 8/2005 | Dunn |
| 2005/0177672 A1 | 8/2005 | Rao |
| 2005/0177755 A1 | 8/2005 | Fung |
| 2005/0195635 A1 | 9/2005 | Conley |
| 2005/0235067 A1 | 10/2005 | Creta |
| 2005/0235171 A1 | 10/2005 | Igari |
| 2006/0031709 A1 | 2/2006 | Hiraiwa |
| 2006/0101197 A1 | 5/2006 | Georgis |
| 2006/0156009 A1 | 7/2006 | Shin |
| 2006/0156012 A1 | 7/2006 | Beeson |
| 2006/0184813 A1 | 8/2006 | Bui |
| 2007/0005901 A1* | 1/2007 | Kellar ............... G06F 12/0862 |
| | | 711/134 |
| 2007/0033323 A1 | 2/2007 | Gorobets |
| 2007/0061502 A1 | 3/2007 | Lasser |
| 2007/0061542 A1 | 3/2007 | Uppala |
| 2007/0101096 A1 | 5/2007 | Gorobets |
| 2007/0168581 A1 | 7/2007 | Klein |
| 2007/0204128 A1 | 8/2007 | Lee |
| 2007/0250756 A1 | 10/2007 | Gower |
| 2007/0266011 A1 | 11/2007 | Rohrs |
| 2007/0283081 A1 | 12/2007 | Lasser |
| 2007/0283104 A1 | 12/2007 | Wellwood |

(56) References Cited

U.S. PATENT DOCUMENTS

| | | |
|---|---|---|
| 2007/0285980 A1 | 12/2007 | Shimizu |
| 2008/0028223 A1 | 1/2008 | Rhoads |
| 2008/0034154 A1 | 2/2008 | Lee |
| 2008/0065805 A1 | 3/2008 | Wu |
| 2008/0082731 A1 | 4/2008 | Karamcheti |
| 2008/0104369 A1 | 5/2008 | Reed |
| 2008/0112238 A1 | 5/2008 | Kim |
| 2008/0163033 A1 | 7/2008 | Yim |
| 2008/0195829 A1 | 8/2008 | Wilsey |
| 2008/0301532 A1 | 12/2008 | Uchikawa |
| 2009/0006667 A1 | 1/2009 | Lin |
| 2009/0089544 A1 | 4/2009 | Liu |
| 2009/0110078 A1 | 4/2009 | Crinon |
| 2009/0113219 A1 | 4/2009 | Aharonov |
| 2009/0125788 A1 | 5/2009 | Wheeler |
| 2009/0177944 A1 | 7/2009 | Kanno |
| 2009/0183052 A1 | 7/2009 | Kanno |
| 2009/0254705 A1 | 10/2009 | Abali |
| 2009/0282275 A1 | 11/2009 | Yermalayeu |
| 2009/0287956 A1 | 11/2009 | Flynn |
| 2009/0307249 A1 | 12/2009 | Koifman |
| 2009/0307426 A1 | 12/2009 | Galloway |
| 2009/0310412 A1 | 12/2009 | Jang |
| 2010/0031000 A1 | 2/2010 | Flynn |
| 2010/0169470 A1 | 7/2010 | Takashige |
| 2010/0217952 A1 | 8/2010 | Iyer |
| 2010/0229224 A1 | 9/2010 | Etchegoyen |
| 2010/0241848 A1 | 9/2010 | Smith |
| 2010/0281254 A1 | 11/2010 | Carro |
| 2010/0321999 A1 | 12/2010 | Yoo |
| 2010/0325367 A1 | 12/2010 | Kornegay |
| 2010/0332922 A1 | 12/2010 | Chang |
| 2011/0031546 A1 | 2/2011 | Uenaka |
| 2011/0055458 A1 | 3/2011 | Kuehne |
| 2011/0055471 A1 | 3/2011 | Thatcher |
| 2011/0060722 A1 | 3/2011 | Li |
| 2011/0072204 A1 | 3/2011 | Chang |
| 2011/0099418 A1 | 4/2011 | Chen |
| 2011/0153903 A1 | 6/2011 | Hinkle |
| 2011/0161621 A1 | 6/2011 | Sinclair |
| 2011/0161784 A1 | 6/2011 | Selinger |
| 2011/0191525 A1 | 8/2011 | Hsu |
| 2011/0218969 A1 | 9/2011 | Anglin |
| 2011/0231598 A1 | 9/2011 | Hatsuda |
| 2011/0239083 A1 | 9/2011 | Kanno |
| 2011/0252188 A1 | 10/2011 | Weingarten |
| 2011/0258514 A1 | 10/2011 | Lasser |
| 2011/0289263 A1 | 11/2011 | Mcwilliams |
| 2011/0289280 A1 | 11/2011 | Koseki |
| 2011/0292538 A1 | 12/2011 | Haga |
| 2011/0296411 A1 | 12/2011 | Tang |
| 2011/0299317 A1 | 12/2011 | Shaeffer |
| 2011/0302353 A1 | 12/2011 | Confalonieri |
| 2011/0302408 A1 | 12/2011 | Mcdermott |
| 2012/0017037 A1 | 1/2012 | Riddle |
| 2012/0039117 A1 | 2/2012 | Webb |
| 2012/0084523 A1 | 4/2012 | Littlefield |
| 2012/0089774 A1 | 4/2012 | Kelkar |
| 2012/0096330 A1 | 4/2012 | Przybylski |
| 2012/0117399 A1 | 5/2012 | Chan |
| 2012/0147021 A1 | 6/2012 | Cheng |
| 2012/0151253 A1 | 6/2012 | Horn |
| 2012/0159099 A1 | 6/2012 | Lindamood |
| 2012/0159289 A1 | 6/2012 | Piccirillo |
| 2012/0173792 A1 | 7/2012 | Lassa |
| 2012/0203958 A1 | 8/2012 | Jones |
| 2012/0210095 A1 | 8/2012 | Nellans |
| 2012/0233523 A1 | 9/2012 | Krishnamoorthy |
| 2012/0246392 A1 | 9/2012 | Cheon |
| 2012/0278579 A1 | 11/2012 | Goss |
| 2012/0284587 A1 | 11/2012 | Yu |
| 2012/0324312 A1 | 12/2012 | Moyer |
| 2012/0331207 A1 | 12/2012 | Lassa |
| 2013/0013880 A1 | 1/2013 | Tashiro |
| 2013/0013887 A1 | 1/2013 | Sugahara |
| 2013/0016970 A1 | 1/2013 | Koka |
| 2013/0018852 A1 | 1/2013 | Barton |
| 2013/0024605 A1 | 1/2013 | Sharon |
| 2013/0054822 A1 | 2/2013 | Mordani |
| 2013/0061029 A1 | 3/2013 | Huff |
| 2013/0073798 A1 | 3/2013 | Kang |
| 2013/0080391 A1 | 3/2013 | Raichstein |
| 2013/0138871 A1 | 5/2013 | Chiu |
| 2013/0144836 A1 | 6/2013 | Adzic |
| 2013/0145085 A1 | 6/2013 | Yu |
| 2013/0145089 A1 | 6/2013 | Eleftheriou |
| 2013/0151759 A1 | 6/2013 | Shim |
| 2013/0159251 A1 | 6/2013 | Skrenta |
| 2013/0159723 A1 | 6/2013 | Brandt |
| 2013/0166820 A1 | 6/2013 | Batwara |
| 2013/0173845 A1 | 7/2013 | Aslam |
| 2013/0179898 A1 | 7/2013 | Fang |
| 2013/0191601 A1 | 7/2013 | Peterson |
| 2013/0205183 A1 | 8/2013 | Fillingim |
| 2013/0219131 A1 | 8/2013 | Alexandron |
| 2013/0227347 A1 | 8/2013 | Cho |
| 2013/0238955 A1 | 9/2013 | D Abreu |
| 2013/0254622 A1 | 9/2013 | Kanno |
| 2013/0318283 A1 | 11/2013 | Small |
| 2013/0318395 A1 | 11/2013 | Kalavade |
| 2013/0325419 A1 | 12/2013 | Al-Shaikh |
| 2013/0329492 A1 | 12/2013 | Yang |
| 2013/0346532 A1 | 12/2013 | D Amato |
| 2014/0006688 A1 | 1/2014 | Yu |
| 2014/0019650 A1 | 1/2014 | Li |
| 2014/0019661 A1 | 1/2014 | Hormuth |
| 2014/0025638 A1 | 1/2014 | Hu |
| 2014/0082273 A1 | 3/2014 | Segev |
| 2014/0082412 A1 | 3/2014 | Matsumura |
| 2014/0095758 A1 | 4/2014 | Smith |
| 2014/0095769 A1 | 4/2014 | Borkenhagen |
| 2014/0095827 A1 | 4/2014 | Wei |
| 2014/0108414 A1 | 4/2014 | Stillerman |
| 2014/0108891 A1 | 4/2014 | Strasser |
| 2014/0164447 A1 | 6/2014 | Tarafdar |
| 2014/0164879 A1 | 6/2014 | Tam |
| 2014/0181532 A1 | 6/2014 | Camp |
| 2014/0195564 A1 | 7/2014 | Talagala |
| 2014/0215129 A1 | 7/2014 | Kuzmin |
| 2014/0223079 A1 | 8/2014 | Zhang |
| 2014/0233950 A1 | 8/2014 | Luo |
| 2014/0250259 A1 | 9/2014 | Ke |
| 2014/0279927 A1 | 9/2014 | Constantinescu |
| 2014/0304452 A1 | 10/2014 | De La Iglesia |
| 2014/0310574 A1 | 10/2014 | Yu |
| 2014/0337457 A1 | 11/2014 | Nowoczynski |
| 2014/0359229 A1 | 12/2014 | Cota-Robles |
| 2014/0365707 A1 | 12/2014 | Talagala |
| 2014/0379965 A1 | 12/2014 | Gole |
| 2015/0006792 A1 | 1/2015 | Lee |
| 2015/0019798 A1 | 1/2015 | Huang |
| 2015/0039849 A1 | 2/2015 | Lewis |
| 2015/0067436 A1 | 3/2015 | Hu |
| 2015/0082317 A1 | 3/2015 | You |
| 2015/0106556 A1 | 4/2015 | Yu |
| 2015/0106559 A1 | 4/2015 | Cho |
| 2015/0121031 A1 | 4/2015 | Feng |
| 2015/0142752 A1 | 5/2015 | Chennamsetty |
| 2015/0143030 A1 | 5/2015 | Gorobets |
| 2015/0186657 A1 | 7/2015 | Nakhjiri |
| 2015/0199234 A1 | 7/2015 | Choi |
| 2015/0227316 A1 | 8/2015 | Warfield |
| 2015/0234845 A1 | 8/2015 | Moore |
| 2015/0269964 A1 | 9/2015 | Fallone |
| 2015/0277937 A1 | 10/2015 | Swanson |
| 2015/0286477 A1 | 10/2015 | Mathur |
| 2015/0294684 A1 | 10/2015 | Qjang |
| 2015/0301964 A1 | 10/2015 | Brinicombe |
| 2015/0304108 A1 | 10/2015 | Obukhov |
| 2015/0310916 A1 | 10/2015 | Leem |
| 2015/0317095 A1 | 11/2015 | Voigt |
| 2015/0341123 A1 | 11/2015 | Nagarajan |
| 2015/0347025 A1 | 12/2015 | Law |
| 2015/0363271 A1 | 12/2015 | Haustein |

(56) References Cited

U.S. PATENT DOCUMENTS

| | | |
|---|---|---|
| 2015/0363328 A1 | 12/2015 | Candelaria |
| 2015/0370700 A1 | 12/2015 | Sabol |
| 2015/0372597 A1 | 12/2015 | Luo |
| 2016/0014039 A1 | 1/2016 | Reddy |
| 2016/0026575 A1 | 1/2016 | Samanta |
| 2016/0041760 A1 | 2/2016 | Kuang |
| 2016/0048327 A1 | 2/2016 | Jayasena |
| 2016/0048341 A1 | 2/2016 | Constantinescu |
| 2016/0054922 A1 | 2/2016 | Awasthi |
| 2016/0055089 A1* | 2/2016 | Kim ................ G06F 9/383 711/137 |
| 2016/0062885 A1 | 3/2016 | Ryu |
| 2016/0077749 A1 | 3/2016 | Ravimohan |
| 2016/0077764 A1 | 3/2016 | Ori |
| 2016/0077968 A1 | 3/2016 | Sela |
| 2016/0078245 A1 | 3/2016 | Amarendran |
| 2016/0098344 A1 | 4/2016 | Gorobets |
| 2016/0098350 A1 | 4/2016 | Tang |
| 2016/0103631 A1 | 4/2016 | Ke |
| 2016/0110254 A1 | 4/2016 | Cronie |
| 2016/0124742 A1 | 5/2016 | Rangasamy |
| 2016/0132237 A1 | 5/2016 | Jeong |
| 2016/0141047 A1 | 5/2016 | Sehgal |
| 2016/0154601 A1 | 6/2016 | Chen |
| 2016/0155750 A1 | 6/2016 | Yasuda |
| 2016/0162187 A1 | 6/2016 | Lee |
| 2016/0179399 A1 | 6/2016 | Melik-Martirosian |
| 2016/0188223 A1 | 6/2016 | Camp |
| 2016/0188890 A1 | 6/2016 | Naeimi |
| 2016/0203000 A1 | 7/2016 | Parmar |
| 2016/0224267 A1 | 8/2016 | Yang |
| 2016/0232103 A1 | 8/2016 | Schmisseur |
| 2016/0234297 A1 | 8/2016 | Ambach |
| 2016/0239074 A1 | 8/2016 | Lee |
| 2016/0239380 A1 | 8/2016 | Wideman |
| 2016/0274636 A1 | 9/2016 | Kim |
| 2016/0283140 A1 | 9/2016 | Kaushik |
| 2016/0306699 A1 | 10/2016 | Resch |
| 2016/0306853 A1 | 10/2016 | Sabaa |
| 2016/0321002 A1 | 11/2016 | Jung |
| 2016/0335085 A1 | 11/2016 | Scalabrino |
| 2016/0342345 A1 | 11/2016 | Kankani |
| 2016/0343429 A1 | 11/2016 | Nieuwejaar |
| 2016/0350002 A1 | 12/2016 | Vergis |
| 2016/0350385 A1 | 12/2016 | Poder |
| 2016/0364146 A1 | 12/2016 | Kuttner |
| 2016/0381442 A1 | 12/2016 | Heanue |
| 2017/0004037 A1 | 1/2017 | Park |
| 2017/0010652 A1 | 1/2017 | Huang |
| 2017/0068639 A1 | 3/2017 | Davis |
| 2017/0075583 A1 | 3/2017 | Alexander |
| 2017/0075594 A1 | 3/2017 | Badam |
| 2017/0091110 A1 | 3/2017 | Ash |
| 2017/0109199 A1 | 4/2017 | Chen |
| 2017/0109232 A1 | 4/2017 | Cha |
| 2017/0123655 A1 | 5/2017 | Sinclair |
| 2017/0147499 A1 | 5/2017 | Mohan |
| 2017/0161194 A1* | 6/2017 | Loh ................ G06F 12/1054 |
| 2017/0161202 A1 | 6/2017 | Erez |
| 2017/0162235 A1 | 6/2017 | De |
| 2017/0168986 A1 | 6/2017 | Sajeepa |
| 2017/0177217 A1 | 6/2017 | Kanno |
| 2017/0177259 A1 | 6/2017 | Motwani |
| 2017/0185316 A1 | 6/2017 | Nieuwejaar |
| 2017/0185498 A1 | 6/2017 | Gao |
| 2017/0192848 A1 | 7/2017 | Pamies-Juarez |
| 2017/0199823 A1 | 7/2017 | Hayes |
| 2017/0212680 A1 | 7/2017 | Waghulde |
| 2017/0212708 A1 | 7/2017 | Suhas |
| 2017/0220254 A1 | 8/2017 | Warfield |
| 2017/0221519 A1 | 8/2017 | Matsuo |
| 2017/0228157 A1 | 8/2017 | Yang |
| 2017/0242722 A1 | 8/2017 | Qiu |
| 2017/0249162 A1 | 8/2017 | Tsirkin |
| 2017/0262176 A1 | 9/2017 | Kanno |
| 2017/0262178 A1 | 9/2017 | Hashimoto |
| 2017/0262217 A1 | 9/2017 | Pradhan |
| 2017/0269998 A1 | 9/2017 | Sunwoo |
| 2017/0277655 A1 | 9/2017 | Das |
| 2017/0279460 A1 | 9/2017 | Camp |
| 2017/0285976 A1 | 10/2017 | Durham |
| 2017/0286311 A1 | 10/2017 | Juenemann |
| 2017/0322888 A1 | 11/2017 | Booth |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0024779 A1 | 1/2018 | Kojima |
| 2018/0033491 A1 | 2/2018 | Marelli |
| 2018/0052797 A1 | 2/2018 | Barzik |
| 2018/0067847 A1 | 3/2018 | Oh |
| 2018/0069658 A1 | 3/2018 | Benisty |
| 2018/0074730 A1 | 3/2018 | Inoue |
| 2018/0076828 A1 | 3/2018 | Kanno |
| 2018/0088867 A1 | 3/2018 | Kaminaga |
| 2018/0107591 A1 | 4/2018 | Smith |
| 2018/0113631 A1 | 4/2018 | Zhang |
| 2018/0143780 A1 | 5/2018 | Cho |
| 2018/0150640 A1 | 5/2018 | Li |
| 2018/0165038 A1 | 6/2018 | Authement |
| 2018/0165169 A1 | 6/2018 | Camp |
| 2018/0165340 A1 | 6/2018 | Agarwal |
| 2018/0167268 A1 | 6/2018 | Liguori |
| 2018/0173620 A1 | 6/2018 | Cen |
| 2018/0188970 A1 | 7/2018 | Liu |
| 2018/0189175 A1 | 7/2018 | Ji |
| 2018/0189182 A1 | 7/2018 | Wang |
| 2018/0212951 A1 | 7/2018 | Goodrum |
| 2018/0219561 A1 | 8/2018 | Litsyn |
| 2018/0226124 A1 | 8/2018 | Perner |
| 2018/0232151 A1 | 8/2018 | Badam |
| 2018/0260148 A1 | 9/2018 | Klein |
| 2018/0270110 A1 | 9/2018 | Chugtu |
| 2018/0293014 A1 | 10/2018 | Ravimohan |
| 2018/0300203 A1 | 10/2018 | Kathpal |
| 2018/0307620 A1 | 10/2018 | Zhou |
| 2018/0321864 A1 | 11/2018 | Benisty |
| 2018/0322024 A1 | 11/2018 | Nagao |
| 2018/0329776 A1 | 11/2018 | Lai |
| 2018/0336921 A1 | 11/2018 | Ryun |
| 2018/0349396 A1 | 12/2018 | Blagojevic |
| 2018/0356992 A1 | 12/2018 | Lamberts |
| 2018/0357126 A1 | 12/2018 | Dhuse |
| 2018/0373428 A1 | 12/2018 | Kan |
| 2018/0373655 A1 | 12/2018 | Liu |
| 2018/0373664 A1 | 12/2018 | Vijayrao |
| 2019/0004944 A1 | 1/2019 | Widder |
| 2019/0012111 A1 | 1/2019 | Li |
| 2019/0034454 A1 | 1/2019 | Gangumalla |
| 2019/0042571 A1 | 2/2019 | Li |
| 2019/0050312 A1 | 2/2019 | Li |
| 2019/0050327 A1 | 2/2019 | Li |
| 2019/0065085 A1 | 2/2019 | Jean |
| 2019/0073261 A1 | 3/2019 | Halbert |
| 2019/0073262 A1 | 3/2019 | Chen |
| 2019/0087089 A1 | 3/2019 | Yoshida |
| 2019/0087115 A1 | 3/2019 | Li |
| 2019/0087328 A1 | 3/2019 | Kanno |
| 2019/0108145 A1 | 4/2019 | Raghava |
| 2019/0116127 A1 | 4/2019 | Pismenny |
| 2019/0166725 A1 | 5/2019 | Jing |
| 2019/0171532 A1 | 6/2019 | Abadi |
| 2019/0172820 A1 | 6/2019 | Meyers |
| 2019/0196748 A1 | 6/2019 | Badam |
| 2019/0196907 A1 | 6/2019 | Khan |
| 2019/0205206 A1 | 7/2019 | Hornung |
| 2019/0212949 A1 | 7/2019 | Pletka |
| 2019/0220392 A1 | 7/2019 | Lin |
| 2019/0227927 A1 | 7/2019 | Miao |
| 2019/0272242 A1 | 9/2019 | Kachare |
| 2019/0278654 A1 | 9/2019 | Kaynak |
| 2019/0278849 A1 | 9/2019 | Chandramouli |
| 2019/0317901 A1 | 10/2019 | Kachare |
| 2019/0320020 A1 | 10/2019 | Lee |

(56) References Cited

U.S. PATENT DOCUMENTS

| | | |
|---|---|---|
| 2019/0339998 A1 | 11/2019 | Momchilov |
| 2019/0361611 A1 | 11/2019 | Hosogi |
| 2019/0377632 A1 | 12/2019 | Oh |
| 2019/0377821 A1 | 12/2019 | Pleshachkov |
| 2019/0391748 A1 | 12/2019 | Li |
| 2020/0004456 A1 | 1/2020 | Williams |
| 2020/0004674 A1 | 1/2020 | Williams |
| 2020/0013458 A1 | 1/2020 | Schreck |
| 2020/0042223 A1 | 2/2020 | Li |
| 2020/0042387 A1 | 2/2020 | Shani |
| 2020/0082006 A1 | 3/2020 | Rupp |
| 2020/0084918 A1 | 3/2020 | Shen |
| 2020/0089430 A1 | 3/2020 | Kanno |
| 2020/0092209 A1 | 3/2020 | Chen |
| 2020/0097189 A1 | 3/2020 | Tao |
| 2020/0133841 A1 | 4/2020 | Davis |
| 2020/0133873 A1* | 4/2020 | Williams ............ G06F 12/0842 |
| 2020/0143885 A1 | 5/2020 | Kim |
| 2020/0159425 A1 | 5/2020 | Flynn |
| 2020/0167091 A1 | 5/2020 | Haridas |
| 2020/0210309 A1 | 7/2020 | Jung |
| 2020/0218449 A1 | 7/2020 | Leitao |
| 2020/0225875 A1 | 7/2020 | Oh |
| 2020/0242021 A1 | 7/2020 | Gholamipour |
| 2020/0250032 A1 | 8/2020 | Goyal |
| 2020/0257598 A1 | 8/2020 | Yazovitsky |
| 2020/0322287 A1 | 10/2020 | Connor |
| 2020/0326855 A1 | 10/2020 | Wu |
| 2020/0328192 A1 | 10/2020 | Zaman |
| 2020/0348888 A1 | 11/2020 | Kim |
| 2020/0364094 A1 | 11/2020 | Kahle |
| 2020/0371955 A1 | 11/2020 | Goodacre |
| 2020/0387327 A1 | 12/2020 | Hsieh |
| 2020/0401334 A1 | 12/2020 | Saxena |
| 2020/0409559 A1 | 12/2020 | Sharon |
| 2020/0409791 A1 | 12/2020 | Devriendt |
| 2021/0010338 A1 | 1/2021 | Santos |
| 2021/0075633 A1 | 3/2021 | Sen |
| 2021/0089392 A1 | 3/2021 | Shirakawa |
| 2021/0103388 A1 | 4/2021 | Choi |
| 2021/0124488 A1 | 4/2021 | Stoica |
| 2021/0132999 A1 | 5/2021 | Haywood |
| 2021/0191635 A1 | 6/2021 | Hu |
| 2021/0263795 A1 | 8/2021 | Li |
| 2021/0286555 A1 | 9/2021 | Li |

FOREIGN PATENT DOCUMENTS

| | | |
|---|---|---|
| WO | 9418634 | 8/1994 |
| WO | 1994018634 | 8/1994 |

OTHER PUBLICATIONS

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India. pp. 1-7, 2017, <10.1145/3124680.3124741>. <hal-01654985>.

EMC Powerpath Load Balancing and Failover Comparison with native MPIO operating system solutions. Feb. 2011.

Tsuchiya, Yoshihiro et al. "DBLK: Deduplication for Primary Block Storage", MSST 2011, Denver, CO, May 23-27, 2011 pp. 1-5.

Chen Feng, et al. "CAFTL: a Content-Aware Flash Translation Layer Enhancing the Lifespan of Flash Memory based Solid State Devices"< FAST'11, San Jose, CA Feb. 15-17, 2011, pp. 1-14.

Wu, Huijun et al. "HPDedup: a Hybrid Prioritized Data Deduplication Mechanism for Primary Storage in the Cloud", Cornell Univ. arXiv: 1702.08153v2[cs.DC], Apr. 16, 2017, pp. 1-14https://www.syncids.com/#.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.

Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.

Jimenex, X., Novo, D. and P. Ienne, "Pheonix:Reviving MLC Blocks as SLC to Extend NAND Flash Devices Lifetime," Design, Automation & Text in Europe Conference & Exhibition (DATE), 2013.

Yang, T. Wu, H. and W. Sun, "GD-FTL: Improving the Performance and Lifetime of TLC SSD by Downgrading Worn-out Blocks," IEEE 37th International Performance Computing and Communications Conference (IPCCC), 2018.

C. Wu, D. Wu, H. Chou and C. Cheng, "Rethink the Design of Flash Translation Layers in a Component-Based View", in IEEE Acess, vol. 5, pp. 12895-12912, 2017.

Po-Liang Wu, Yuan-Hao Chang and T. Kuo, "A file-system-aware FTL design for flash-memory storage systems," 2009, pp. 393-398.

S. Choudhuri and T. Givargis, "Preformance improvement of block based NAND flash translation layer", 2007 5th IEEE/ACM/IFIP International Conference on Hardware/Software Codesign and Systems Synthesis (CODES+ISSS). Saizburg, 2007, pp. 257-262.

A. Zuck, O. Kishon and S. Toledo. "LSDM: Improving the Preformance of Mobile Storage with a Log-Structured Address Remapping Device Driver", 2014 Eighth International Conference on Next Generation Mobile Apps, Services and Technologies, Oxford, 2014, pp. 221-228.

J. Jung and Y. Won, "nvramdisk: a Transactional Block Device Driver for Non-Volatile RAM", in IEEE Transactions on Computers, vol. 65, No. 2, pp. 589-600, Feb. 1, 2016.

Te I et al. (Pensieve: a Machine Assisted SSD Layer for Extending the Lifetime: (Year: 2018).

ARM ("Cortex-R5 and Cortex-R5F", Technical reference Manual, Revision r1p1) (Year:2011).

* cited by examiner

METHOD AND SYSTEM FOR FACILITATING MULTI-STREAM SEQUENTIAL READ PERFORMANCE IMPROVEMENT WITH REDUCED READ AMPLIFICATION

BACKGROUND

Field

This disclosure is generally related to the field of data storage. More specifically, this disclosure is related to a method and system for facilitating multi-stream sequential read performance improvement with reduced read amplification.

Related Art

Today, various storage systems are being used to store and access the ever-increasing amount of digital content. A storage system can include storage servers with one or more storage devices or drives (such as a solid-state drive (SSD)). Data can be stored in a non-volatile storage media of an SSD, e.g., in Not-And flash (NAND) flash. SSDs continue to evolve with increased capacity and parallelism. However, the file system continues to use an access granularity (e.g., 4 KB) which is relatively smaller than the preliminary read unit of NAND flash (e.g., 16 KB). As a result, most of the data which is physically read from a NAND page is dropped after being sensed. This can result in both a non-trivial read amplification and an increased number of issued read operations, which can increase the overall latency of read requests. In addition, the issued read operations can increase the "read disturb" (e.g., where the coupling effect of reading from a given NAND flash cell can impact the neighboring cells), and can result in a decrease in the quality and reliability of the stored data.

Read operations can include both random read requests and sequential read requests. While a random read request may not follow any identifiable patterns, a sequential read request may follow an identifiable pattern based on the predictability of consecutive or sequential logical block addresses (LBAs). One current solution to reduce the number of issued read operations (e.g., the accessing of NAND pages) is to place several (e.g., four) consecutive LBAs in the same physical NAND page, which allows the system to read all four LBAs in a single read operation from the NAND flash, rather than in four separate read operations. However, in a multi-stream scenario, the requested LBAs may be received by the SSD interleaved and out-of-order, which is similar to a random read and can result in the same challenges described above, e.g., an increase in read latency and read amplification and a decrease in the performance and lifespan of the SSD.

SUMMARY

One embodiment provides a system which facilitates data management. The system receives, by a storage device via read requests from multiple streams, a first plurality of logical block addresses (LBAs) and corresponding stream identifiers. The system assigns a respective LBA to a first queue of a plurality of queues based on the stream identifier corresponding to the LBA. Responsive to determining that a second plurality of LBAs in the first queue are of a sequentially similar pattern: the system retrieves, from a non-volatile memory of the storage device, data associated with the second plurality of LBAs; and the system stores the retrieved data and the second plurality of LBAs in a volatile memory of the storage device while bypassing data-processing operations.

In some embodiments, responsive to determining, based on a predetermined threshold, that the second plurality of LBAs in the first queue are not of a sequentially similar pattern, the system performs the following operations. The system retrieves, from the non-volatile memory of the storage device, first data associated with the second plurality of LBAs. The system refrains from storing the retrieved first data and the second plurality of LBAs in the volatile memory. The system performs data-processing operations, including an error correction code (ECC)-decoding and a cyclic redundancy check (CRC), on the retrieved first data. The system returns the processed first data as error-free data to a requesting application.

In some embodiments, the data-processing operations comprise an error correction code (ECC)-decoding and a cyclic redundancy check (CRC).

In some embodiments, the plurality of queues comprises first in, first out (FIFO) queues.

In some embodiments, the system determines that the second plurality of LBAs in the first queue are of a sequentially similar pattern based on a predetermined threshold, and this determination further comprises, for a first LBA and a second LBA assigned to the first queue, the following operations. The system truncates least significant bits of the first LBA and the second LBA. The system compares, based on a bitwise exclusive-or, the truncated first LBA and the truncated second LBA to obtain a first result. The system accumulates the first result and other results from comparing pairs of truncated LBAs assigned to the first queue. The system tracks a current number of matching results based on the accumulated results.

In some embodiments, in response to determining that the current number of matching results is greater than the predetermined threshold, the system generates a decision that the second plurality of LBAs are of a sequentially similar pattern. In response to determining that the current number of matching results is not greater than the predetermined threshold, the system generates a decision that the second plurality of LBAs are not of a sequentially similar pattern.

In some embodiments, the system determines incoming LBAs associated with a first read request from a requesting application, and compares the incoming LBAs with the stored second plurality of LBAs to obtain a second result.

In some embodiments, the retrieved data and the second plurality of LBAs are stored in the volatile memory as raw data. In response to determining, based on the second result, that the incoming LBAs match the stored second plurality of LBAs, the system performs the following operations: reads the raw data from the volatile memory; performs data-processing operations, including an ECC-decoding and a cyclic redundancy check, on the raw data; and returns the processed data as error-free data to a requesting application.

In some embodiments, in response to determining, based on the second result, that the incoming LBAs do not match the stored second plurality of LBAs, the system performs the following operations: retrieves, from the non-volatile memory of the storage device, second data associated with the incoming LBAs; performs data-processing operations, including an ECC-decoding and a cyclic redundancy check, on the retrieved second data; and returns the processed second data as error-free data to a requesting application.

In some embodiments, the retrieved second data comprises requested data and unrequested data associated with the first read request. The data-processing operations are performed on the requested data associated with the first request. The processed second data returned to the requesting application comprises the processed requested data associated with the first request.

In some embodiments, the system determines that the second plurality of LBAs in the first queue are of a sequentially similar pattern alternatively based on detecting a hint associated with an application.

BRIEF DESCRIPTION OF THE FIGURES

In the figures, like reference numerals refer to the same figure elements.

DETAILED DESCRIPTION

Figure 1:
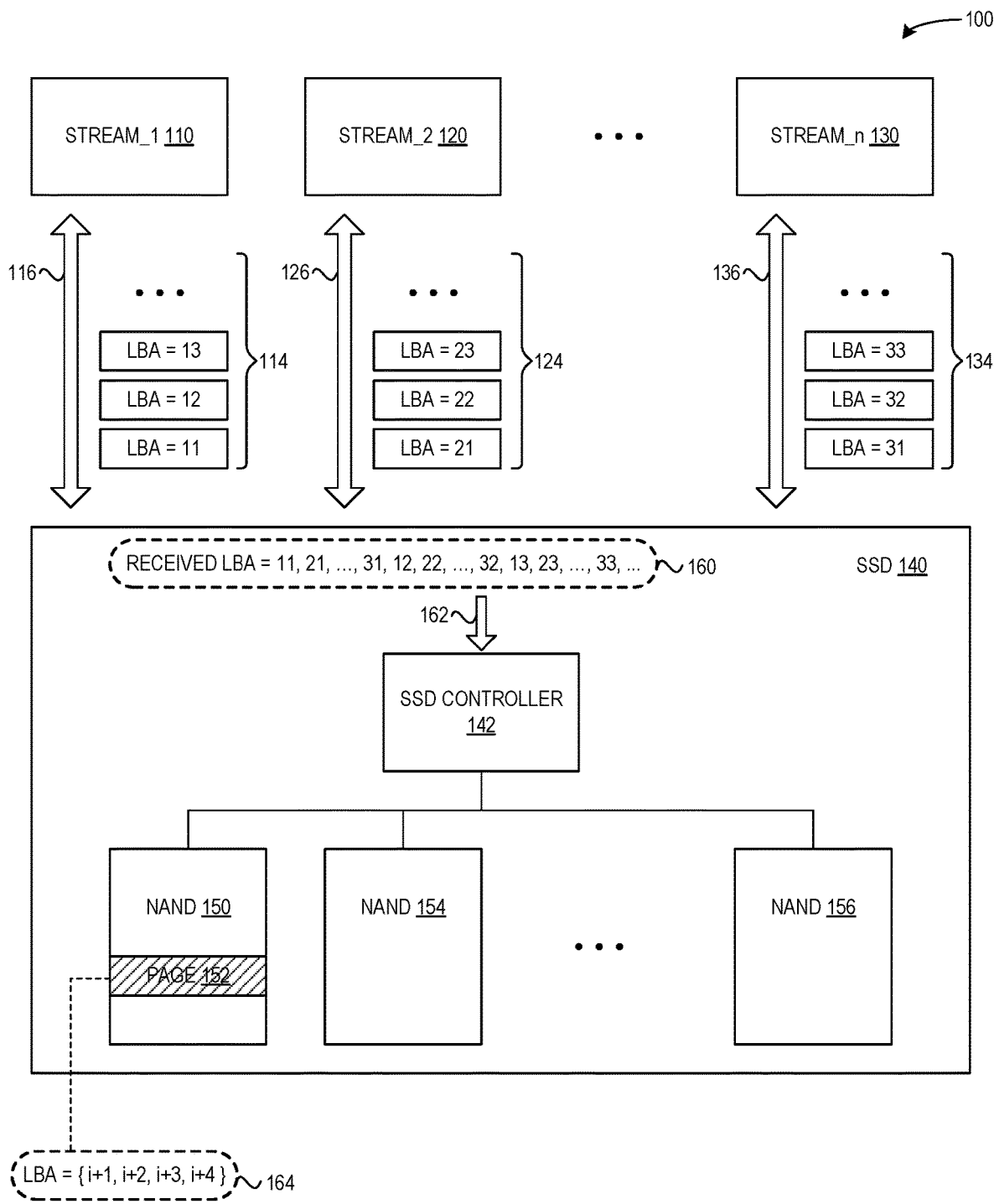
FIG. 1 illustrates an exemplary environment for facilitating a multi-stream sequential read, in accordance with the prior art.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein provide a system which facilitates a performance improvement and a reduced read amplification in a multi-stream sequential read. The system evaluates a multi-stream read scenario, implements an access pattern recognition of the assigned LBAs, and performs predictive data read operations based on the access pattern, which can result in a reduced read amplification.

As described above, the difference between the access granularity of a file system (e.g., 4 KB) and a preliminary read unit of NAND flash (e.g., 16 KB) can result in a non-trivial read amplification, where most of the data which is physically read from a NAND page is dropped after being sensed. In addition to the non-trivial read amplification, this can also result in an increased number of issued read operations, which can increase the overall latency of read requests. The issued read operations can increase the "read disturb" (e.g., where the coupling effect of reading from a given NAND flash cell can impact the neighboring cells), and can result in a decrease in the quality and reliability of the stored data.

Read operations can include both random read requests and sequential read requests. While a random read request may not follow any identifiable patterns, a sequential read request may follow an identifiable pattern based on the predictability of consecutive LBAs. One current solution to reduce the number of issued read operations (e.g., the accessing of NAND pages) is to place several (e.g., four) consecutive LBAs in the same physical NAND page, which allows the system to read all four LBAs in a single read operation from the NAND flash, rather than in four separate read operations. However, in a multi-stream scenario, the requested LBAs may be received by the SSD interleaved and out-of-order, which is similar to a random read and can result in the same challenges described above, e.g., an increase in read latency and read amplification and a decrease in the performance and lifespan of the SSD. An exemplary multi-stream scenario in the prior art is described below in relation to FIG. 1.

The embodiments described herein provide a system which addresses the challenge of mitigating and reducing the read amplification to improve the performance and lifespan of an SSD and the overall storage system. Based on incoming read requests from multiple streams, the system can receive LBAs and corresponding stream identifiers. A stream identifier can be appended to each incoming LBA. The system can assign and place LBAs to first in first out queues based on their corresponding stream identifier. The system can implement an access pattern recognition by determining whether given LBAs in a given queue of a sequentially similar pattern. The determination can be performed by an LBA comparator, which can be implemented in hardware or firmware, as described below in relation to FIGS. 3, 5B, and 5C. An exemplary system for facilitating a multi-stream sequential read is described below in relation to FIG. 2.

If the system determines a sequentially similar pattern for the given LBAs, the system can pre-fetch the corresponding raw data from the non-volatile memory, and hold the raw data and the corresponding given LBAs in a temporary data buffer or a volatile memory of the SSD (e.g., a double data rate (DDR) dynamic random access memory (DRAM)). This allows the system to bypass data-processing operations, such as an ECC-decoding and a cyclic redundancy check. Pre-fetching data and bypassing data-processing operations based on the determination of sequential similarity is described below in relation to FIGS. 4 and 5C.

Subsequently, when evaluating incoming LBAs, the controller can compare the incoming LBAs with the given LBAs stored in the volatile memory. If the results match, the system can retrieve the data directly from the volatile memory, which is more efficient than retrieving the data from the non-volatile memory (e.g., can result in an reduced latency). The system can perform the data-processing operations on the retrieved data, and return error-free data to a requesting application, as described below in relation to FIGS. 4 and 5D. If the results do not match, the system can retrieve the data from the non-volatile memory, perform data-processing operations, and return the error-free data.

Thus, the described embodiments provide a system which can mitigate and reduce read amplification as well as improve the performance of the overall system in a multi-stream sequential read scenario. By implementing an access pattern recognition and performing predictive read operations based on the access pattern recognition, the system provides a technological solution (assigning LBAs to queues based on stream identifiers, determining sequential similarity between LBAs, and pre-fetching raw data while bypassing data-processing operations) to the technological problem of improving performance and reducing read amplification in an SSD based on a multi-stream scenario.

A "distributed storage system" or a "storage system" can include multiple storage servers. A "storage server" or a "storage system" can refer to a computing device which can include multiple storage devices or storage drives. A "storage device" or a "storage drive" refers to a device or a drive with a non-volatile memory which can provide persistent storage of data, e.g., a solid-state drive (SSD), or a flash-based storage device. A storage system can also be a computer system.

"Non-volatile memory" refers to storage media which may be used for persistent storage of data, e.g., flash memory of a NAND die of an SSD, magnetoresistive random access memory (MRAM), phase change memory (PCM), resistive random access memory (ReRAM), or another non-volatile memory.

"Volatile memory" refers to media which may be used to store data temporarily and in which power is required to maintain the stored data. Examples of volatile memory include DDR DRAM.

A "computing device" refers to any server, device, node, entity, drive, or any other entity which can provide any computing capabilities.

The term "read amplification" refers to the situation in which the size or granularity of requested data is smaller than the size or granularity of the overall returned or retrieved data (e.g., from a basic physical unit of NAND flash in a read operation). In this situation, the retrieved data is of a greater size than the requested data, and any portion of the retrieved data which is not the requested data may be dropped. This can result in read amplification, which can result in a suboptimal utilization of resources associated with a read operation.

Exemplary Environment for Multi-Stream Sequential Read in the Prior Art

FIG. 1 illustrates an exemplary environment 100 for facilitating a multi-stream sequential read, in accordance with the prior art. Environment 100 can include multiple streams with sequential LBAs associated with read requests. For example, the streams can include: a stream_1 110, which can include sequential LBAs 114 with values such as 11, 12, and 13; a stream_2 120, which can include sequential LBAs 124 with values such as 21, 22, and 23; and a stream_n 130, which can include sequential LBAs 134 with values such as 31, 32, and 33. Environment 100 can also include an SSD 140 with an SSD controller 142 and NAND flash memory (such as dies) 150, 154, and 156. NAND 150 can store data in physical NAND pages, where each NAND page can include several sequential or consecutive LBAs. For example, NAND 150 can include a page 152, which can correspond to sequential LBAs 164, e.g., {i+1, i+2, i+3, and i+4}. Storing these four sequential LBAs in one physical NAND page can allow the system to read the four LBAs in a single read operation, rather than being read four times. This feature can result in a reduced read amplification.

However, one challenge in utilizing this feature to achieve a reduced read amplification is that the requested LBAs may arrive at the SSD interleaved and out of order. For example, during operation, the system can process incoming read requests from multiple streams 110, 120, and 130 (via, respectively, communications 116, 126, and 136). SSD controller 142 can receive the LBAs (as received LBAs 160 via a communication 162) interleaved and out of order: 11, 21, . . . , 31, 12, 22, . . . , 32, 13, 23, . . . , 33, . . . , etc. That is, while the LBAs from a given stream may appear in order relative to each other, the overall order of the LBAs received (and to be subsequently processed) by SSD controller 142 can be mixed (e.g., interleaved) and out of order relative to the overall order.

Thus, the system may process LBAs 160 as a random read operation and based on a random pattern. This can result in each LBA asking for one round of a NAND page access, which can consume and increase the read latency. The overall latency of environment 100 can be similar to that of a random read. In addition, the read amplification may be considerable based on the significant amount of data which is loaded and then dropped. Thus, in this multi-stream scenario, the system loses the advantage of sequential improvement of the multiple streams and instead results in a decrease in the performance and endurance of the overall storage system.

Figure 2:
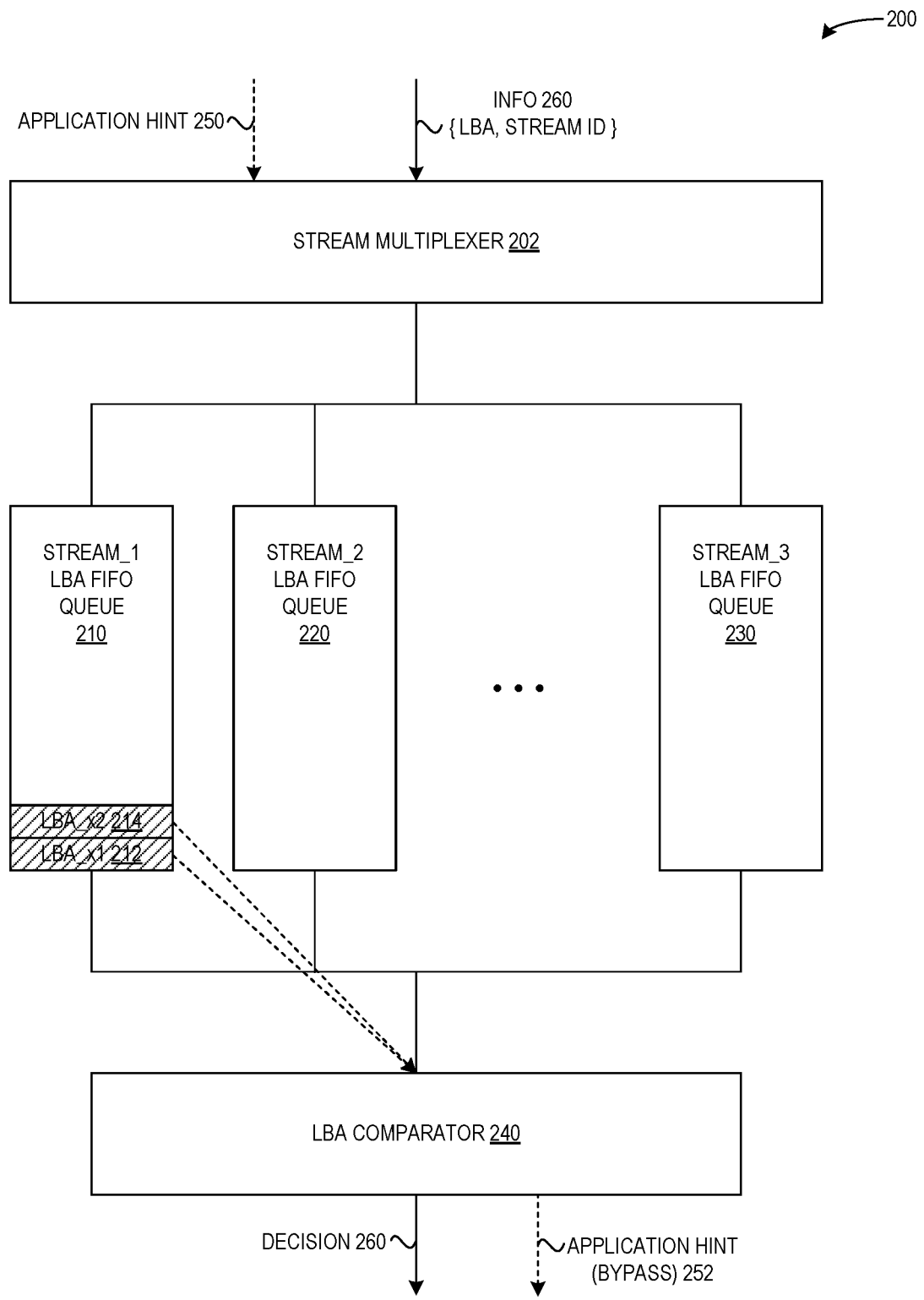
FIG. 2 illustrates an exemplary environment for facilitating a multi-stream sequential read, in accordance with an embodiment of the present application.

Exemplary Environment for Multi-Stream Sequential Read Using Assigned Queues and LBA Comparator FIG. 2 illustrates an exemplary environment 200 for facilitating a multi-stream sequential read, in accordance with an embodiment of the present application. Environment 200 includes: a stream multiplexer 202; a plurality of queues 210, 220, and 230, each corresponding to a particular stream based on a stream identifier; and an LBA comparator 240. During operation, the system can receive information 260, e.g., a plurality of LBAs and corresponding stream identifiers, which are associated with read requests from multiple streams. A respective stream identifier can be appended to a respective LBA.

Stream multiplexer 202 can receive information 260 and assign a respective LBA to a first queue of the plurality of queues based on the corresponding respective stream identifier. Queues 210, 220, and 230 can be first in, first out (FIFO) queues which store LBAs sharing a same stream identifier. FIFO queues may be stored in a buffer in, e.g., a static random access memory (SRAM) of an SSD controller. For example: stream_1 LBA FIFO queue 210 can include LBAs which correspond to a stream identifier of "1" (not shown); stream_2 LBA FIFO queue 220 can include LBAs which correspond to a stream identifier of "2" (not shown); and stream_3 LBA FIFO queue 230 can include LBAs which correspond to a stream identifier of "3" (not shown).

For each queue, and for a certain number of LBAs in a given queue (where the certain number is a second plurality which can be a predetermined number or based on a predetermined rule), LBA comparator 240 can determine whether the second plurality of LBAs in the given queue is of a sequentially similar pattern, and output a decision 260. That is, LBA comparator 240 can determine whether reading ahead and pre-fetching the data can improve the performance of the system and also mitigate the read amplification. In general, LBA comparator 240 can evaluate adjacent LBAs in the same FIFO queue to determine the similarity and the trend, e.g., an LBA_x1 212 and an LBA_x2 214 in FIFO queue 210, and generate decision 260, as described below in relation to FIG. 3.

At the same time, the system can detect a hint associated with an application. For example, an application may issue an application hint 250 which indicates a sequential read for a given set of LBAs or associated with a particular read request from a particular stream or streams. Application hint 250 may also be based on, e.g., a user-specified command sent from a host-side application, a specific software configuration, an eCommerce service, or any other application-related configuration information. If the system does detect such an application hint 250, this application hint 250 can override the decision from LBA comparator 240, as depicted by application hint (bypass) 252.

Exemplary LBA Comparator Module

Figure 3:
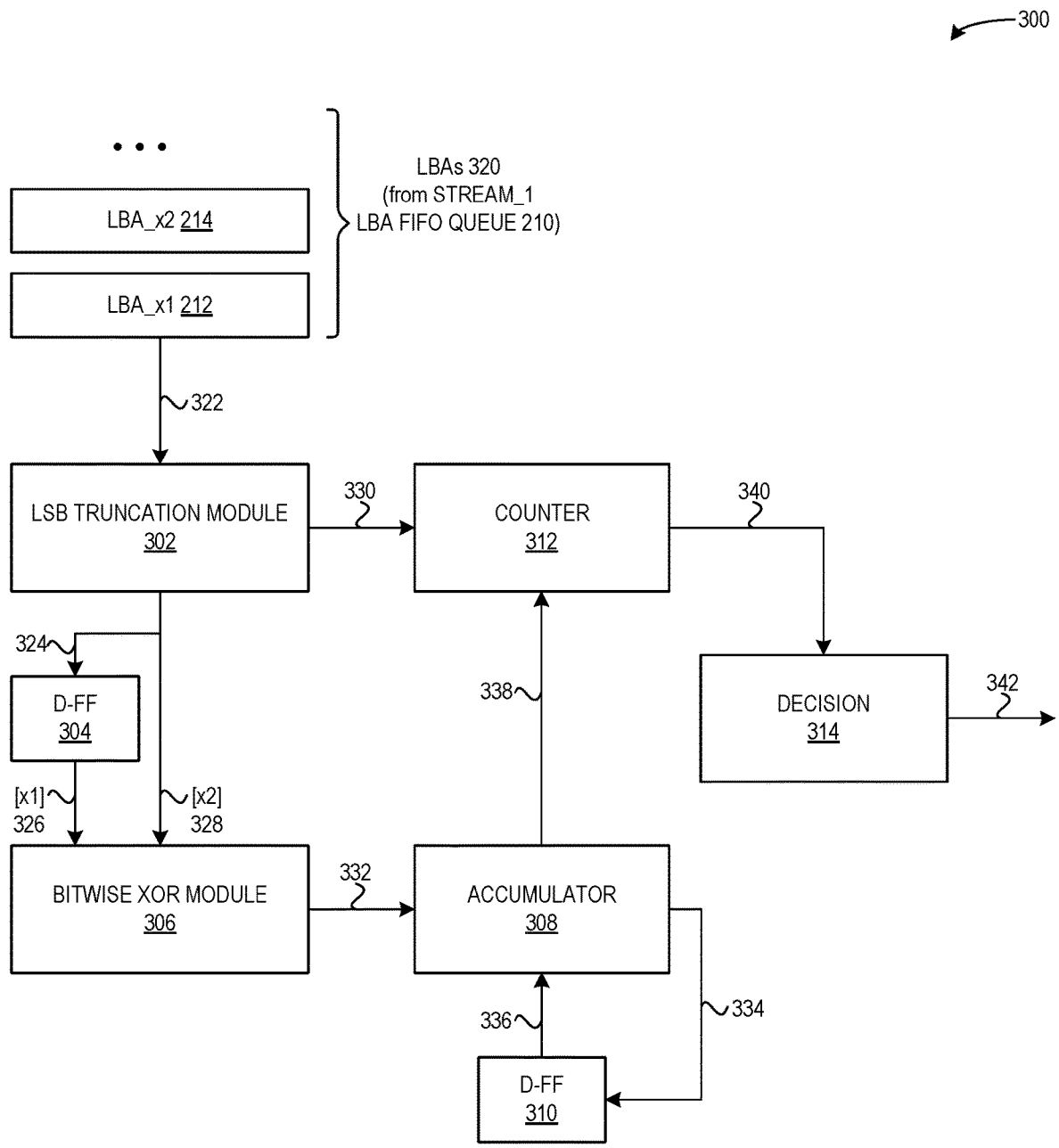
FIG. 3 illustrates an exemplary LBA comparator module, in accordance with an embodiment of the present application.

FIG. 3 illustrates an exemplary LBA comparator module 300, in accordance with an embodiment of the present application. LBA comparator module can correspond to LBA comparator 240 of FIG. 2, and can be implemented in hardware or in firmware. LBA comparator 300 can include: a least significant bits (LSB) truncation module 302; a D-Type Flip Flop (D-FF) component 304; a bitwise exclusive-or (XOR) module 306; an accumulator component 308; a D-FF component 310; a counter 312; and a decision module 314.

During operation, LBA comparator 300 can receive a plurality of LBAs for processing, such as LBA_x1 212 ("x1") and LBA_x2 214 ("x2") from stream_1 LBA FIFO queue 210 of FIG. 2 (via a communication 322). LSB truncation module can truncate both x1 and x2, resulting in a truncated x1 (denoted by "[x1]") and a truncated x2 (denoted by "[x2]"). Using D-FF 304 to buffer a first LBA to form alignment and via communications 324, 326, and 328, bitwise XOR module 306 can compare the truncated first LBA [x1] and the truncated second LBA [x2]. That is, bitwise XOR module 306 can compare the most significant bits (MSBs) of x1 and x2. The number of LSBs and MSBs can be based on predetermined information, such as a first total number of bits for LSBs and/or a second total number of bits for MSBs.

Note that the system compares the MSBs of two LBAs (i.e., the truncated LBAs [x1] and [x2]). As a result, the identified pattern need not be strictly sequential, only "of a sequentially similar pattern." The determination of this sequentially similar pattern is based on both the predetermined threshold or number (as below) and the first or second total number of bits for, respectively, LSBs and MSBs.

Bitwise XOR module 306 can send the result of the comparison to accumulator component 308 (via a communication 332). Using D-FF 310 and via communications 334 and 336, accumulator 308 can accumulate the results of multiple comparisons by bitwise XOR module 306. For each result, accumulator 308 can send a signal 338 to counter 312. Signal 338 can indicate whether two compared (and truncated) LBAs are the same. Counter 312 can track a current number of matching results (i.e., the number of LBAs whose MSBs match). Counter 312 can send the current number of matching results to decision module 314 (via a communication 340).

Decision module 314 can determine whether the current number of matching results is greater than a predetermined number (e.g., 6 or 10 matching LBAs). If the current number of matching results is greater than the predetermined number, decision module 314 can generate a decision 342 which indicates that the plurality of LBAs in stream_1 LBA FIFO queue 210 are of a sequentially similar pattern. This can trigger the pre-fetching and buffering of data from the non-volatile memory to the volatile memory, as described below in relation to FIG. 4.

If the current number of matching results is not greater than the predetermined number, decision module 314 can generate decision 342 which indicates that the plurality of LBAs in stream_1 LBA FIFO queue 210 are not of a sequentially similar pattern. This can trigger a conventional retrieval of the data from the non-volatile memory, as described above in relation to the multi-stream sequential read of prior art environment 100 of FIG. 1.

Pre-Fetching of Raw Data Based on Output from LBA Comparator

Figure 4:
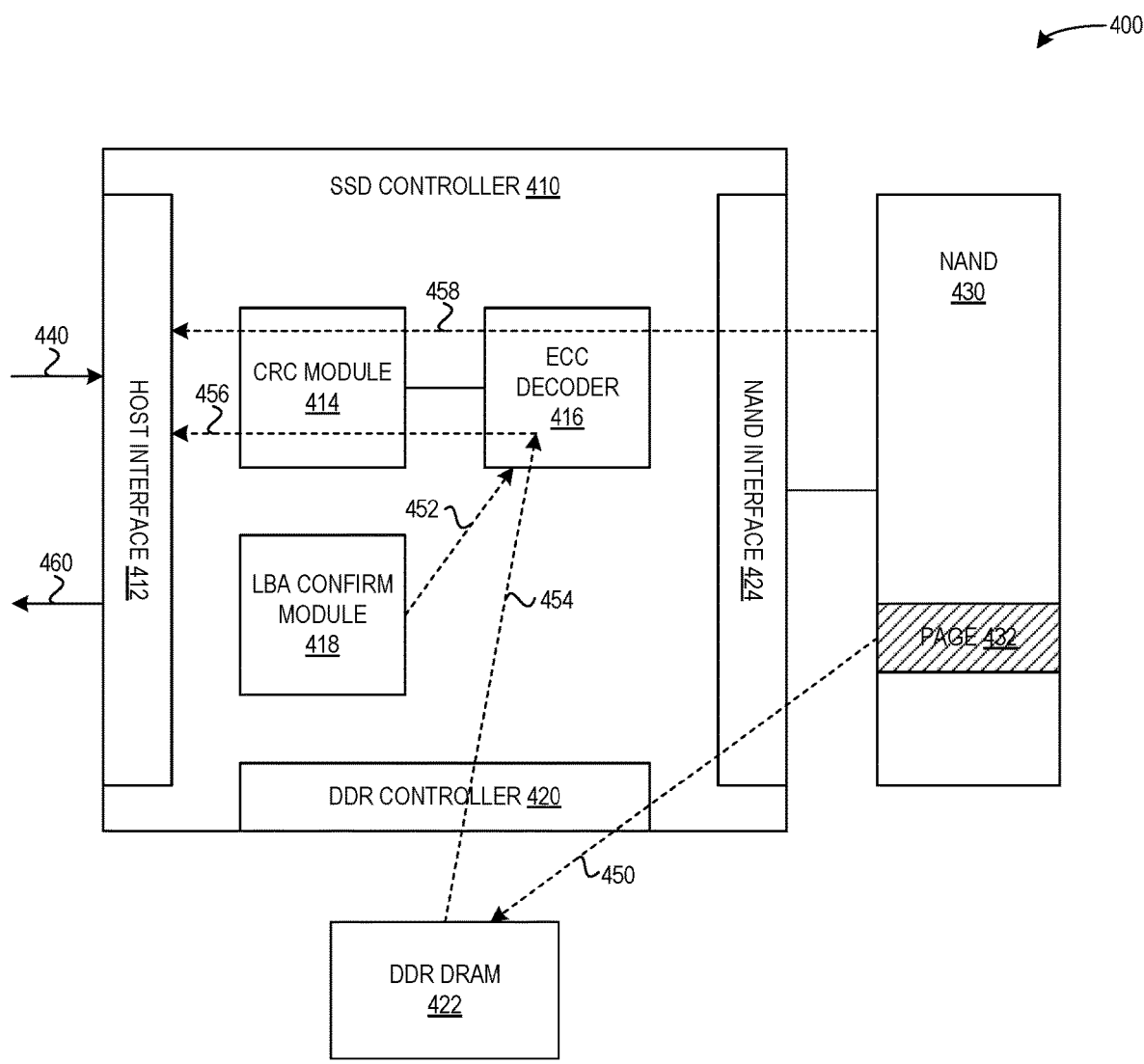
FIG. 4 illustrates an exemplary storage device, including pre-fetching of raw data based on the output of an LBA comparator module, in accordance with an embodiment of the present application.

FIG. 4 illustrates an exemplary storage device 400, including pre-fetching of raw data based on the output of an LBA comparator module, in accordance with an embodiment of the present application. Storage device 400 can be an SSD which can include: an SSD controller 410; and NAND 430. SSD controller 410 can include: a host interface 412; a CRC module 414; an ECC decoder module 416; an LBA confirm module 418; a DDR controller 420 which manages and interfaces with a DDR DRAM 422; and a NAND interface 424 which interfaces with non-volatile memory such as NAND 430. SSD controller 410 can also include an LBA comparator (not shown), such as LBA comparator 240 of FIG. 2 or LBA comparator 300 of FIG. 3.

During operation, SSD controller 410 can receive, via read requests from multiple streams, LBAs and corresponding stream identifiers (via a communication 440). Based on the decision generated by and output from the LBA comparator (e.g., decision 342 in FIG. 3), SSD controller 410 can determine to pre-fetch raw data for buffering in its associated volatile memory.

Assume that a page 432 in NAND 430 includes data associated with the plurality of LBAs (of stream_1 LBA FIFO queue 210) found to be of a sequentially similar pattern. SSD controller can retrieve this raw data (via a communication 450), and store the retrieved raw data, along with the plurality of corresponding LBAs, in DDR DRAM 422. Note that the data is stored in DDR DRAM 422 while bypassing ECC decoder 416 and CRC module 414. That is, SSD controller 410 does not need to perform data-processing operations (such as an ECC-decoding and a CRC check by modules 416 and 414, respectively) on the raw data stored in DDR DRAM 422.

Subsequently, the system can determine incoming LBAs associated with a first read request from a requesting application (not shown). LBA confirm module 418 can compare the incoming LBAs with the stored plurality of corresponding LBAs to obtain a result. The system can determine, based on the obtained result, that the incoming LBAs do match the stored LBAs, and can send the result to a module of controller 410 (e.g., to ECC decoder 416). The system can retrieve the stored raw data from DDR DRAM 422 and send the stored raw data to ECC decoder 416 (via a communication 454). The system can perform data-processing operations on the raw data, e.g., ECC decoder 416 can perform an ECC decoding on the raw data, and CRC module 414 can perform a CRC on the ECC-decoded data (via a communication 456), and the system can return the processed data as error-free data to a requesting application (via communication 456 and a communication 460).

The system can also determine, based on the obtained results, that the incoming LBAs do not match the stored LBAs, in which case the system can retrieve the data corresponding to the incoming LBAs directly from NAND 430, perform data-processing operations on the retrieved data, and return the processed data as error-free data to the requesting application (via a communication 458).

Note that the data retrieved via communication 458 can include both requested data and unrequested data associated with the first read request. In some embodiments, the system can perform the data-processing operations only on the requested data, and return only the processed requested data to the requesting application. The system may detect a predetermined condition, and responsive to detecting the predetermined condition, the system may store the unrequested data associated with the first read request in a temporary data buffer or in the volatile memory (e.g., DDR DRAM 422) of the storage device. The predetermined condition may include a setting which results in the system buffering certain LBAs and/or the unrequested data associated with the certain LBAs.

Exemplary Method for Facilitating a Multi-Stream Sequential Read

Figure 5A:
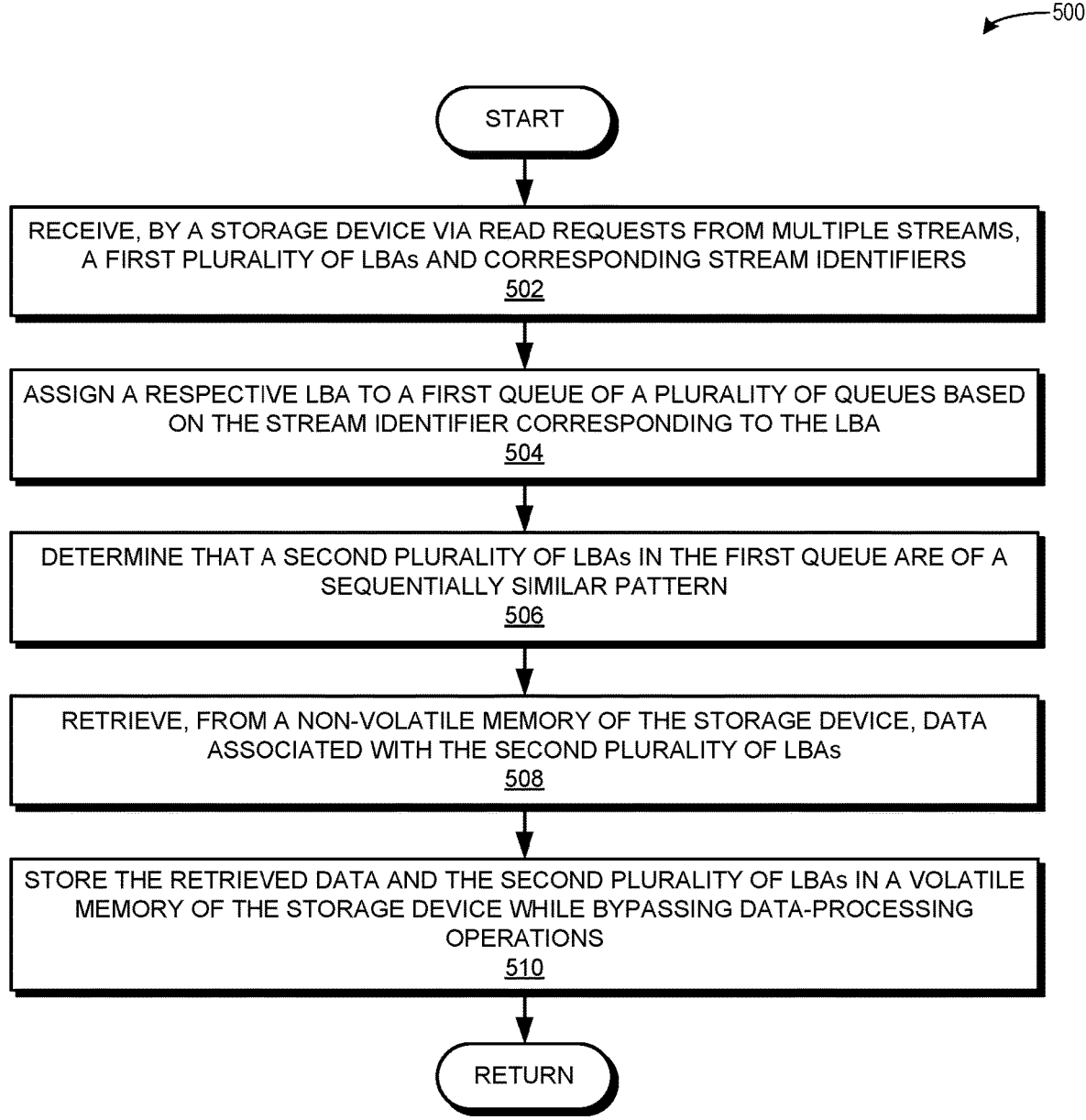
FIG. 5A presents a flowchart illustrating a method for facilitating a multi-stream sequential read, in accordance with an embodiment of the present application.

FIG. 5A presents a flowchart 500 illustrating a method for facilitating a multi-stream sequential read, in accordance with an embodiment of the present application. During operation, the system receives, by a storage device via read requests from multiple streams, a first plurality of LBAs and corresponding stream identifiers (operation 502). The system assigns a respective LBA to a first queue of a plurality of queues based on the stream identifier corresponding to the LBA (operation 504). The queues can be FIFO queues. The system determines that a second plurality of LBAs in the first queue are of a sequentially similar pattern (operation 506). The system retrieves, from a non-volatile memory of the storage device, data associated with the second plurality of LBAs (operation 508), and the system stores the retrieved data and the second plurality of LBAs in a volatile memory of the storage device while bypassing data-processing operations (operation 510). Operations 508 and 510 are responsive to operation 506, and the data-processing operations can include an ECC-decoding and a cyclic redundancy check.

Figure 5B:
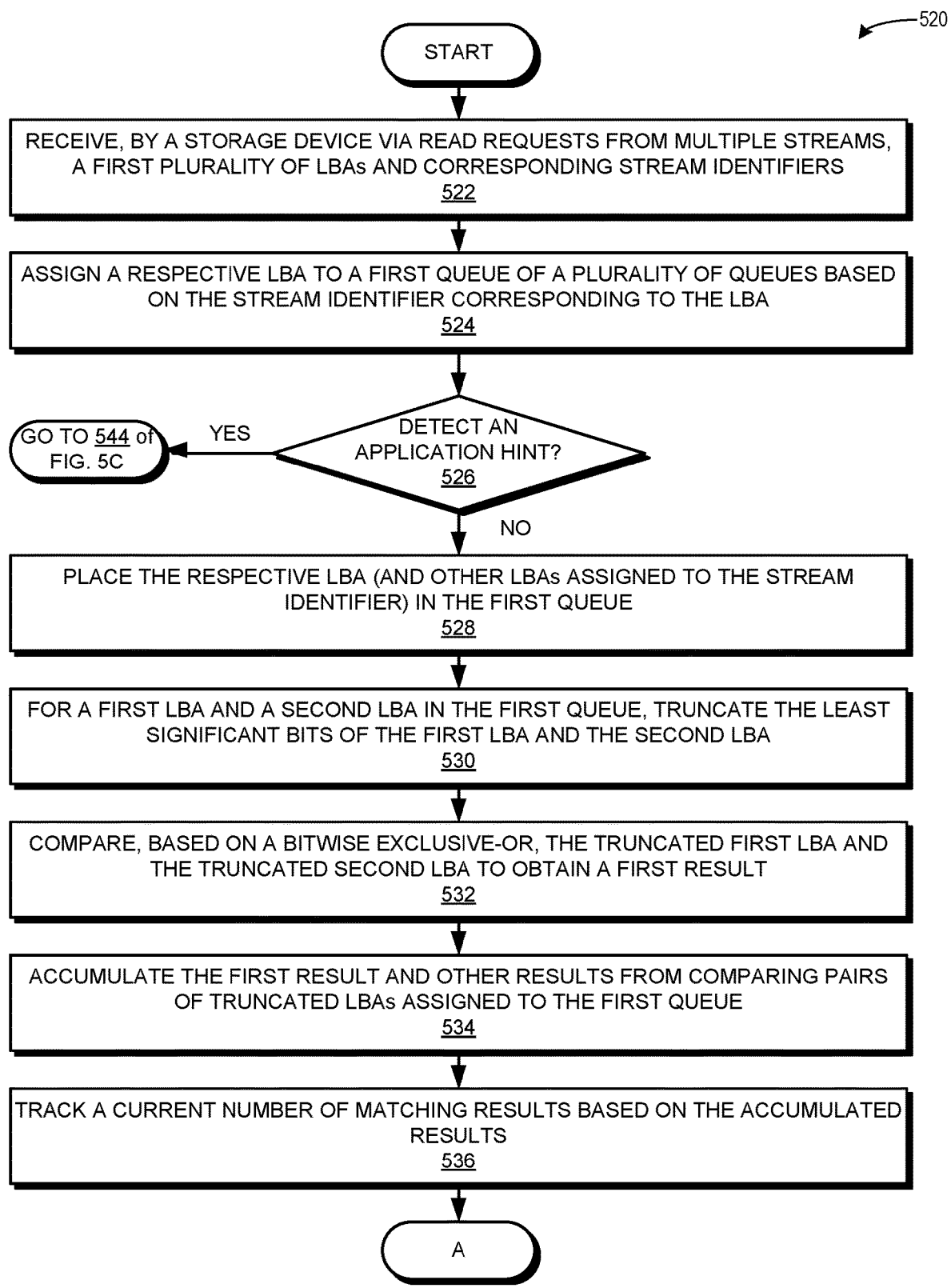
FIG. 5B presents a flowchart illustrating a method for facilitating a multi-stream sequential read, including operations by an LBA comparator module, in accordance with an embodiment of the present application.

FIG. 5B presents a flowchart 520 illustrating a method for facilitating a multi-stream sequential read, including operations by an LBA comparator module, in accordance with an embodiment of the present application. During operation, the system receives, by a storage device via read requests from multiple streams, a first plurality of LBAs and corresponding stream identifiers (operation 522). The system assigns a respective LBA to a first queue of a plurality of queues based on the stream identifier corresponding to the LBA (operation 524). The queues can be FIFO queues. If the system detects a hint from an application (decision 526), the system bypasses operation 528 and the operations of the LBA comparator module (e.g., operations 530-536 of FIG. 5B and operation 542 of FIG. 5C), and continues at operation 544 of FIG. 5C. The application hint can indicate that a set of LBAs from a given stream are sequential or of a sequentially similar pattern, and should thus be processed together, which results in bypassing certain operations and continuing at operation 544 of FIG. 5C.

If the system does not detect an application hint (decision 526), the system places the respective LBA (and other LBAs assigned to the stream identifier) in the first queue (operation 528). The system can iterate through LBAs in the first queue by pairs of LBAs, which are placed in the first queue in a first in, first out (FIFO) manner. The system, by an LBA comparator, can determine whether the LBAs in the first queue are of a sequentially similar pattern, by processing two LBAs at a time and by performing operations 530-536 and 542, as described below and in relation to FIG. 3.

For a first LBA and a second LBA in the first queue, the system truncates least significant bits (LSBs) of the first LBA and the second LBA (operation 530). The system compares, based on a bitwise exclusive-or, the truncated first LBA and the truncated second LBA to obtain a first result (operation 532), i.e., the system compares the most significant bits (MSBs) of the first LBA and the second LBA. The system accumulates the first result and other results from comparing pairs of truncated LBAs assigned to the first queue (operation 534). The system tracks a current number of matching results based on the accumulated results (operation 536). The operation continues at Label A of FIG. 5C.

Figure 5C:
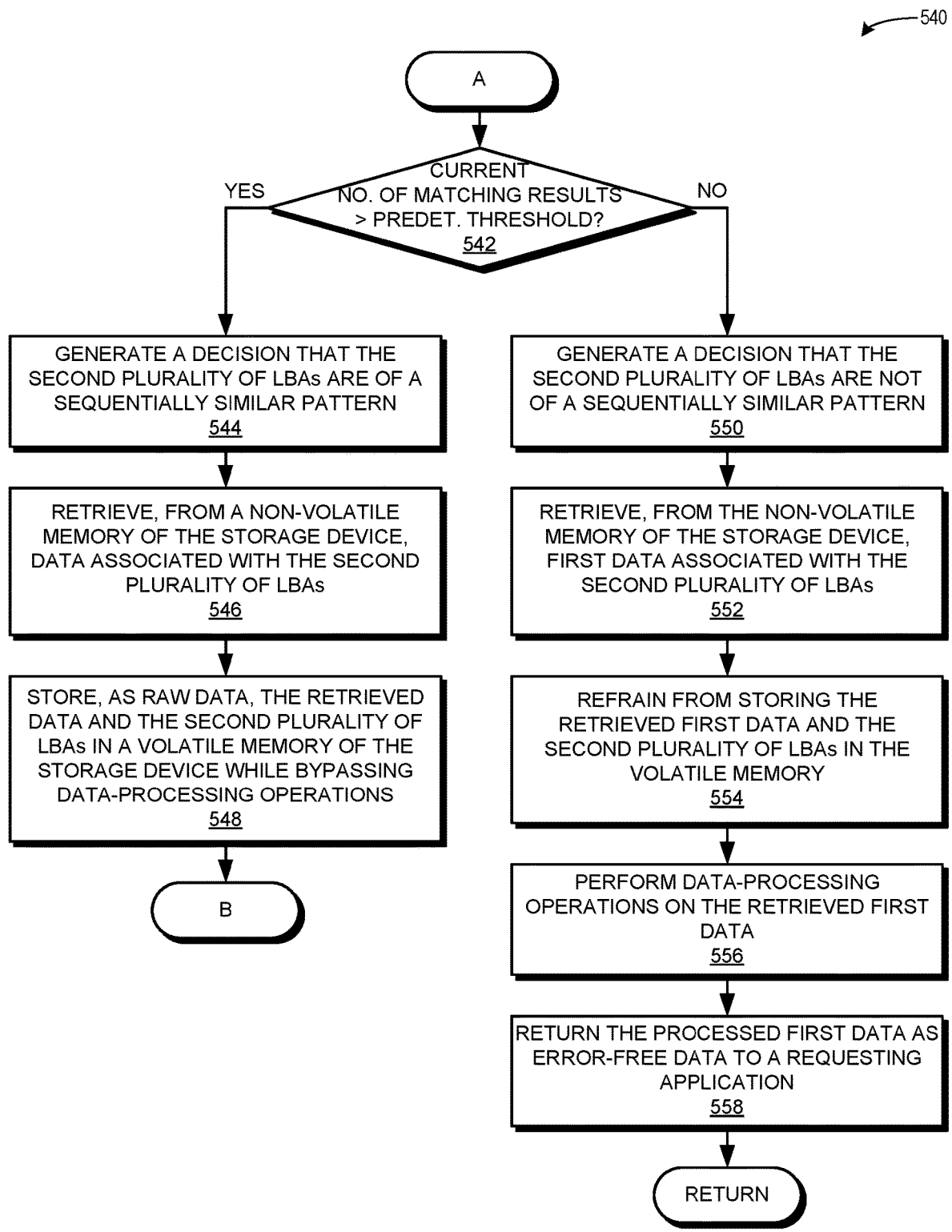
FIG. 5C presents a flowchart illustrating a method for facilitating a multi-stream sequential read, including operations by an LBA comparator module, in accordance with an embodiment of the present application.

FIG. 5C presents a flowchart 540 illustrating a method for facilitating a multi-stream sequential read, including operations by an LBA comparator module, in accordance with an embodiment of the present application. If the system determines that the current number of matching results is greater than the predetermined threshold (decision 542), the system generates a decision that the second plurality of LBAs are of a sequentially similar pattern (operation 544, similar to operation 506). The system retrieves, from a non-volatile memory of the storage device, data associated with the second plurality of LBAs (operation 546, similar to operation 508). The system stores, as raw data, the retrieved data and the second plurality of LBAs in a volatile memory of the storage device while bypassing data-processing operations (operation 548, similar to operation 510). The operation continues at Label B of FIG. 5D.

If the system determines that the current number of matching results is not greater than the predetermined threshold (decision 542), the system generates a decision that the second plurality of LBAs are not of a sequentially similar pattern (operation 550). The system retrieves, from the non-volatile memory of the storage device, first data associated with the second plurality of LBAs (operation 552). The system refrains from storing the retrieved first data and the second plurality of LBAs in the volatile memory (operation 554). The system performs data-processing operations on the retrieved first data (operation 556). As described above and in relation to FIG. 5, the data-processing operations can include an ECC-decoding and a cyclic redundancy check. The system returns the processed first data as error-free data to a requesting application (operation 558). The operation returns.

Figure 5D:
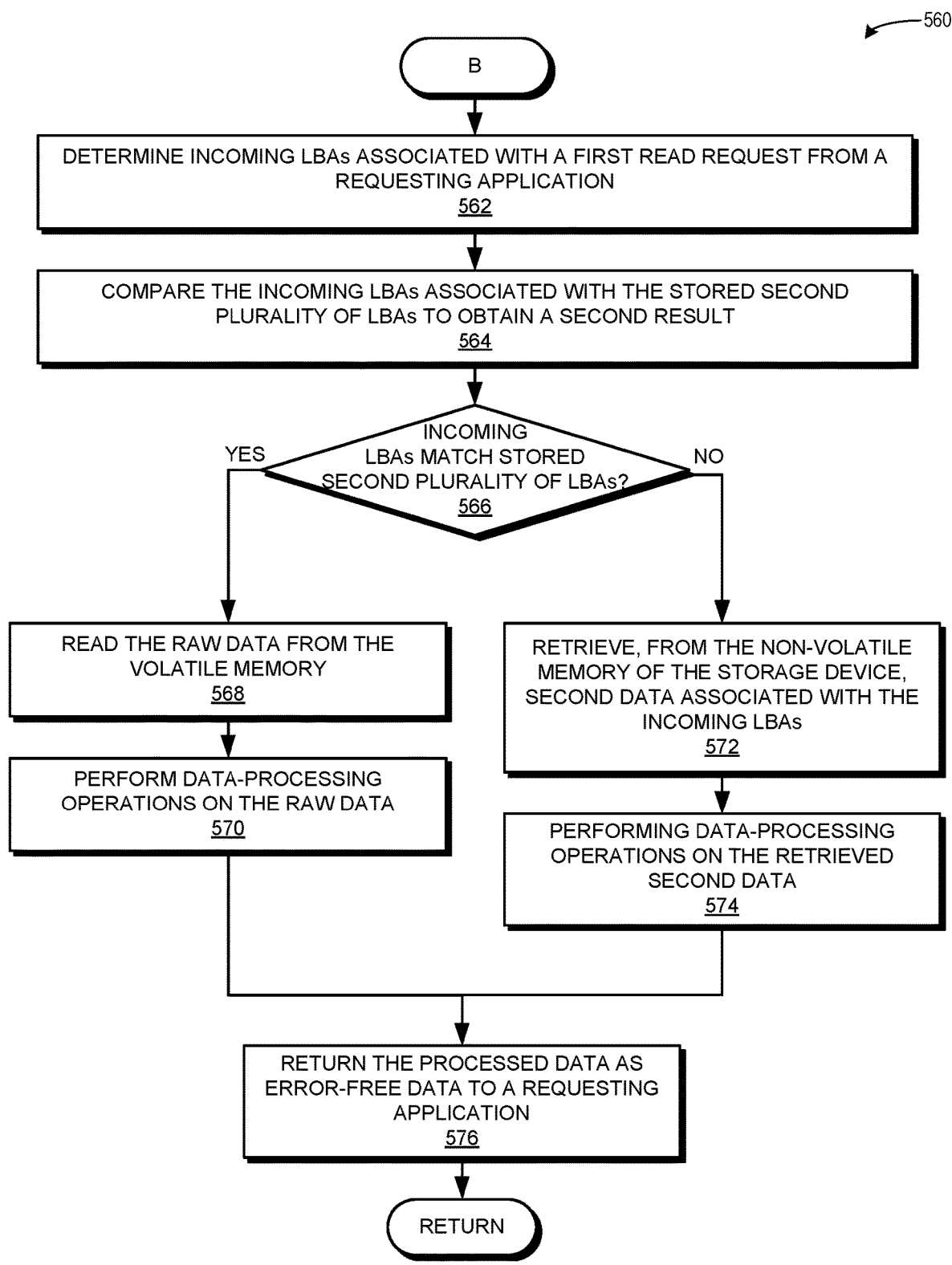
FIG. 5D presents a flowchart illustrating a method for facilitating a multi-stream sequential read, including comparing incoming LBAs with the LBAs for the data stored in the volatile memory, in accordance with an embodiment of the present application.

FIG. 5D presents a flowchart 560 illustrating a method for facilitating a multi-stream sequential read, including comparing incoming LBAs with the LBAs for the data stored in the volatile memory, in accordance with an embodiment of the present application. The system determines incoming LBAs associated with a first read request from a requesting application (operation 562). The system compares the incoming LBAs with the stored second plurality of LBAs to obtain a second result (operation 564). Based on the second result, if the incoming LBAs match the stored second plurality of LBAs (decision 566), the system reads the raw data from the volatile memory (operation 568), performs data-processing operations on the raw data (operation 570), and returns the processed data as error-free data to a requesting application (operation 576).

Based on the second result, if the incoming LBAs do not match the stored second plurality of LBAs (decision 566), the system retrieves, from the non-volatile memory of the storage device, second data associated with the incoming LBAs (operation 572), performs data-processing operations on the retrieved second data (operation 574), and returns the processed (second) data as error-free data to a requesting application (operation 576). Note that operation 576 indicates "processed" data, and can refer to either the processed raw data retrieved from the volatile memory as part of operation 570 or the processed second data retrieved from the non-volatile memory as part of operation 574. The operation returns.

Exemplary Computer System and Apparatus

Figure 6:
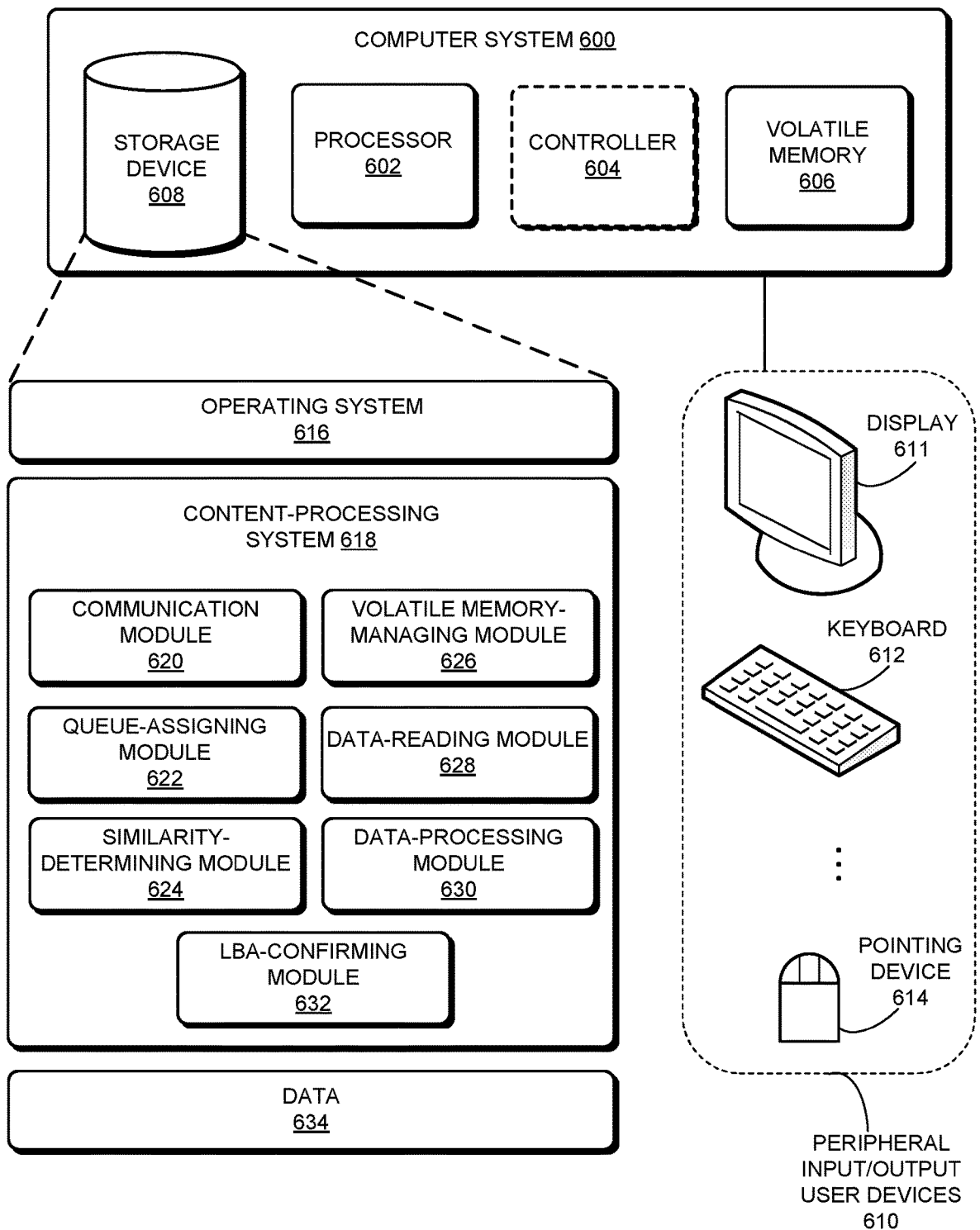
FIG. 6 illustrates an exemplary computer system that facilitates a multi-stream sequential read, in accordance with an embodiment of the present application.

FIG. 6 illustrates an exemplary computer system 600 that facilitates a multi-stream sequential read, in accordance with an embodiment of the present application. Computer system 600 includes a processor 602, a volatile memory 606, and a storage device 608. In some embodiments, computer system 600 can include a controller 604 (indicated by the dashed lines). Volatile memory 606 can include, e.g., random access memory (RAM), that serves as a managed memory, and can be used to store one or more memory pools. Storage device 608 can include persistent storage which can be managed or accessed via processor 602 (or controller 604). Furthermore, computer system 600 can be coupled to peripheral input/output (I/O) user devices 610, e.g., a display device 611, a keyboard 612, and a pointing device 614. Storage device 608 can store an operating system 616, a content-processing system 618, and data 634.

Content-processing system 618 can include instructions, which when executed by computer system 600, can cause computer system 600 or processor 602 to perform methods and/or processes described in this disclosure. Specifically, content-processing system 618 can include instructions for receiving and transmitting data packets, including data to be read, an LBA, a stream identifier, and an input/output (I/O) request (e.g., a read request or a write request) (communication module 620).

Content-processing system 618 can further include instructions for receiving, by a storage device via read requests from multiple streams, a first plurality of LBAs and corresponding stream identifiers (communication module 620). Content-processing system 618 can include instructions for assigning a respective LBA to a first queue of a plurality of queues based on the stream identifier corresponding to the LBA (queue-assigning module 622). Content-processing system 618 can include instructions for, responsive to determining that a second plurality of LBAs in the first queue are of a sequentially similar pattern (similarity-determining module 624): retrieving, from a non-volatile memory of the storage device, data associated with the second plurality of LBAs (data-reading module 628); and storing the retrieved data and the second plurality of LBAs in a volatile memory of the storage device while bypassing data-processing operations (volatile memory-managing module 626).

Content-processing system 618 can also include instructions for, responsive to determining, based on a predetermined threshold, that the second plurality of LBAs in the first queue are not of a sequentially similar pattern (similarity-determining module 624): retrieving, from the non-volatile memory of the storage device, first data associated with the second plurality of LBAs (data-reading module 628); refraining from storing the retrieved first data and the second plurality of LBAs in the volatile memory (volatile memory-managing module 626); performing data-processing operations, including an error correction code (ECC)-decoding and a cyclic redundancy check (CRC), on the retrieved first data (data-processing module 630); and returning the processed first data as error-free data to a requesting application (communication module 620).

Content-processing system 618 can additionally include instructions for: truncating least significant bits of the first LBA and the second LBA; comparing, based on a bitwise exclusive-or, the truncated first LBA and the truncated second LBA to obtain a first result; accumulating the first result and other results from comparing pairs of truncated LBAs assigned to the first queue; and tracking a current number of matching results based on the accumulated results (similarity-determining module 624). The operations of similarity-determining module 624 can be performed by an LBA comparator, as described above in relation to FIG. 3.

Content-processing system 618 can include instructions for determining incoming LBAs associated with a first read request from a requesting application (LBA-confirming module 632). Content-processing system 618 can also include instructions for comparing the incoming LBAs with the stored second plurality of LBAs to obtain a second result (LBA-confirming module 632).

Data 634 can include any data that is required as input or generated as output by the methods and/or processes described in this disclosure. Specifically, data 634 can store at least: data; a request; a read request; an indicator of a stream; a stream identifier; a logical block address (LBA); a physical block address (PBA); metadata; an LBA appended with a corresponding stream identifier; a queue; a FIFO queue; an indicator or identifier of a queue; a determination or decision that a plurality of LBA is of a sequentially similar pattern; a predetermined threshold; a predetermined number; a predetermined rule; retrieved data; processed data; raw data; ECC-encoded or decoded data; data which has not or has undergone a cyclic redundancy check; error-free data; least significant bits; most significant bits; a truncated LBA; a result of a comparison between two truncated LSBs; an accumulated result; a matching result; a current number of matching results; incoming LBAs associated with a first read request; a result of a comparison between incoming LBA and a stored plurality of LBAs; a determination of whether one set of LBAs matches another set of LBAs; a predetermined condition; requested data; unrequested data; and a hint associated with an application.

Figure 7:
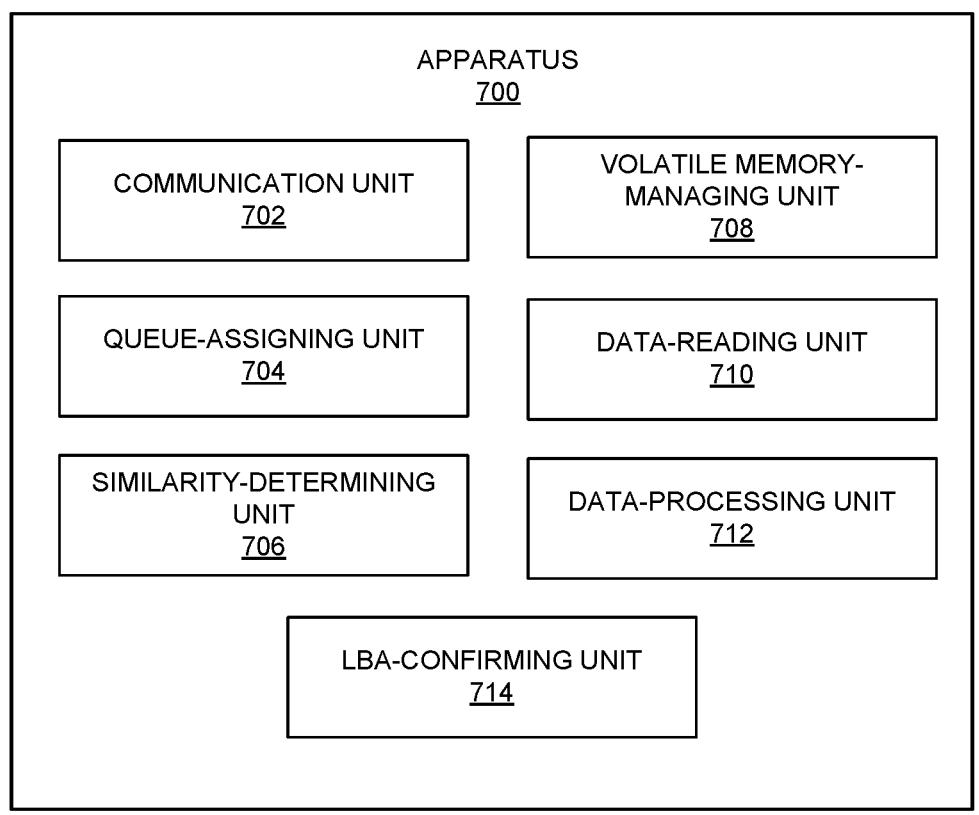
FIG. 7 illustrates an exemplary apparatus that facilitates a multi-stream sequential read, in accordance with an embodiment of the present application.

FIG. 7 illustrates an exemplary apparatus 700 that facilitates a multi-stream sequential read, in accordance with an embodiment of the present application. Apparatus 700 can comprise a plurality of units or apparatuses which may communicate with one another via a wired, wireless, quantum light, or electrical communication channel. Apparatus 700 may be realized using one or more integrated circuits, and may include fewer or more units or apparatuses than those shown in FIG. 7. Furthermore, apparatus 700 may be integrated in a computer system, or realized as a separate device or devices capable of communicating with other computer systems and/or devices.

Apparatus 700 can comprise modules or units 702-714 which are configured to perform functions or operations similar to modules 620-632 of computer system 600 of FIG. 6, including: a communication unit 702; a queue-assigning unit 704; a similarity-determining unit 706; a volatile memory-managing unit 708; a data-reading unit 710; a data-processing unit 712; and an LBA-confirming unit 714.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method, comprising:
    receiving, by a storage device via read requests from multiple streams, a first plurality of logical block addresses (LBAs) and corresponding stream identifiers;
    assigning a respective LBA to a first queue of a plurality of queues based on the stream identifier corresponding to the LBA; and
    responsive to determining that a second plurality of LBAs in the first queue are of a sequentially similar pattern:
        retrieving, from a non-volatile memory of the storage device, data associated with the second plurality of LBAs; and
        storing the retrieved data and the second plurality of LBAs in a volatile memory of the storage device while bypassing data-processing operations, wherein the data-processing operations comprise an error correction code (ECC)-decoding and a cyclic redundancy check (CRC).

2. The method of claim 1, further comprising:
    responsive to determining, based on a predetermined threshold, that the second plurality of LBAs in the first queue are not of a sequentially similar pattern:
        retrieving, from the non-volatile memory of the storage device, first data associated with the second plurality of LBAs;
        refraining from storing the retrieved first data and the second plurality of LBAs in the volatile memory;
        performing data-processing operations, including an error correction code (ECC)-decoding and a cyclic redundancy check (CRC), on the retrieved first data; and
        returning the processed first data as error-free data to a requesting application.

3. The method of claim 1,
    wherein the plurality of queues comprises first in, first out (FIFO) queues.

4. The method of claim 1, wherein determining that the second plurality of LBAs in the first queue are of a sequentially similar pattern is based on a predetermined threshold and further comprises, for a first LBA and a second LBA assigned to the first queue:
    truncating least significant bits of the first LBA and the second LBA;
    comparing, based on a bitwise exclusive-or, the truncated first LBA and the truncated second LBA to obtain a first result;
    accumulating the first result and other results from comparing pairs of truncated LBAs assigned to the first queue; and
    tracking a current number of matching results based on the accumulated results.

5. The method of claim 4, further comprising:
    in response to determining that the current number of matching results is greater than the predetermined threshold, generating a decision that the second plurality of LBAs are of a sequentially similar pattern; and
    in response to determining that the current number of matching results is not greater than the predetermined threshold, generating a decision that the second plurality of LBAs are not of a sequentially similar pattern.

6. The method of claim 1, further comprising:
    determining incoming LBAs associated with a first read request from a requesting application; and
    comparing the incoming LBAs with the stored second plurality of LBAs to obtain a second result.

7. The method of claim 6, wherein the retrieved data and the second plurality of LBAs are stored in the volatile memory as raw data, and wherein the method further comprises:
    in response to determining, based on the second result, that the incoming LBAs match the stored second plurality of LBAs:
        reading the raw data from the volatile memory;
        performing data-processing operations, including an ECC-decoding and a cyclic redundancy check, on the raw data; and
        returning the processed data as error-free data to a requesting application.

8. The method of claim 6,
    in response to determining, based on the second result, that the incoming LBAs do not match the stored second plurality of LBAs:
        retrieving, from the non-volatile memory of the storage device, second data associated with the incoming LBAs;
        performing data-processing operations, including an ECC-decoding and a cyclic redundancy check, on the retrieved second data; and
        returning the processed second data as error-free data to a requesting application.

9. The method of claim 8,
    wherein the retrieved second data comprises requested data and unrequested data associated with the first read request,
    wherein the data-processing operations are performed on the requested data associated with the first request, and
    wherein the processed second data returned to the requesting application comprises the processed requested data associated with the first request.

10. The method of claim 1, wherein determining that the second plurality of LBAs in the first queue are of a sequentially similar pattern is based on detecting a hint associated with an application.

11. A computer system, comprising:
  a processor; and
  a memory coupled to the processor and storing instructions which, when executed by the processor, cause the processor to perform a method, the method comprising:
    receiving, by a storage device via read requests from multiple streams, a first plurality of logical block addresses (LBAs) and corresponding stream identifiers;
    assigning a respective LBA to a first queue of a plurality of queues based on the stream identifier corresponding to the LBA; and
    responsive to determining that a second plurality of LBAs in the first queue are of a sequentially similar pattern:
      retrieving, from a non-volatile memory of the storage device, data associated with the second plurality of LBAs; and
      storing the retrieved data and the second plurality of LBAs in a volatile memory of the storage device while bypassing data-processing operations, wherein the data-processing operations comprise an error correction code (ECC)-decoding and a cyclic redundancy check (CRC).

12. The computer system of claim 11, wherein the method further comprises:
  responsive to determining, based on a predetermined threshold, that the second plurality of LBAs in the first queue are not of a sequentially similar pattern:
    retrieving, from the non-volatile memory of the storage device, first data associated with the second plurality of LBAs;
    refraining from storing the retrieved first data and the second plurality of LBAs in the volatile memory;
    performing data-processing operations, including an error correction code (ECC)-decoding and a cyclic redundancy check (CRC), on the retrieved first data; and
    returning the processed first data as error-free data to a requesting application.

13. The computer system of claim 11, wherein determining that the second plurality of LBAs in the first queue are of a sequentially similar pattern is based on a predetermined threshold and further comprises, for a first LBA and a second LBA assigned to the first queue:
  truncating least significant bits of the first LBA and the second LBA;
  comparing, based on a bitwise exclusive-or, the truncated first LBA and the truncated second LBA to obtain a first result;
  accumulating the first result and other results from comparing pairs of truncated LBAs assigned to the first queue; and
  tracking a current number of matching results based on the accumulated results.

14. The computer system of claim 13, wherein the method further comprises:
  in response to determining that the current number of matching results is greater than the predetermined threshold, generating a decision that the second plurality of LBAs are of a sequentially similar pattern; and
  in response to determining that the current number of matching results is not greater than the predetermined threshold, generating a decision that the second plurality of LBAs are not of a sequentially similar pattern.

15. The computer system of claim 11, wherein the retrieved data and the second plurality of LBAs are stored in the volatile memory as raw data, and wherein the method further comprises:
  determining incoming LBAs associated with a first read request from a requesting application;
  comparing the incoming LBAs with the stored second plurality of LBAs to obtain a second result; and
  in response to determining, based on the second result, that the incoming LBAs match the stored second plurality of LBAs:
    reading the raw data from the volatile memory;
    performing data-processing operations, including an ECC-decoding and a cyclic redundancy check, on the raw data; and
    returning the processed data as error-free data to a requesting application.

16. The computer system of claim 15, wherein the method further comprises:
  in response to determining, based on the second result, that the incoming LBAs do not match the stored second plurality of LBAs:
    retrieving, from the non-volatile memory of the storage device, second data associated with the incoming LBAs;
    performing data-processing operations, including an ECC-decoding and a cyclic redundancy check, on the retrieved second data; and
    returning the processed second data as error-free data to a requesting application.

17. The computer system of claim 11, wherein determining that the second plurality of LBAs in the first queue are of a sequentially similar pattern is based on detecting a hint associated with an application.

18. A non-transitory computer-readable storage medium storing instructions that when executed by a computer cause the computer to perform a method, the method comprising:
  receiving, by a storage device via read requests from multiple streams, a first plurality of logical block addresses (LBAs) and corresponding stream identifiers;
  assigning a respective LBA to a first queue of a plurality of queues based on the stream identifier corresponding to the LBA; and
  responsive to determining that a second plurality of LBAs in the first queue are of a sequentially similar pattern:
    retrieving, from a non-volatile memory of the storage device, data associated with the second plurality of LBAs; and
    storing the retrieved data and the second plurality of LBAs in a volatile memory of the storage device while bypassing data-processing operations, wherein the data-processing operations comprise an error correction code (ECC)-decoding and a cyclic redundancy check (CRC).

19. The storage medium of claim 18, wherein the retrieved data and the second plurality of LBAs are stored in the volatile memory as raw data, and wherein the method further comprises:
  determining incoming LBAs associated with a first read request from a requesting application;
  comparing the incoming LBAs with the stored second plurality of LBAs to obtain a second result; and
  in response to determining, based on the second result, that the incoming LBAs match the stored second plurality of LBAs:

reading the raw data from the volatile memory;
performing data-processing operations, including an ECC-decoding and a cyclic redundancy check, on the raw data; and
returning the processed data as error-free data to a requesting application.

20. The storage medium of claim 18, wherein the method further comprises:
responsive to determining, based on a predetermined threshold, that the second plurality of LBAs in the first queue are not of a sequentially similar pattern:
retrieving, from the non-volatile memory of the storage device, first data associated with the second plurality of LBAs;
refraining from storing the retrieved first data and the second plurality of LBAs in the volatile memory;
performing the data-processing operations on the retrieved first data; and
returning the processed first data as error-free data to a requesting application.

* * * * *